(12) United States Patent
Wand et al.

(10) Patent No.: US 7,083,832 B2
(45) Date of Patent: Aug. 1, 2006

(54) PARTIALLY FLUORINATED LIQUID CRYSTAL MATERIAL

(75) Inventors: Michael Wand, Boulder, CO (US); Neil Gough, Longmont, CO (US); Xin Hua Chen, Erie, CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 09/854,181

(22) Filed: May 11, 2001

(65) Prior Publication Data

US 2003/0017278 A1    Jan. 23, 2003

Related U.S. Application Data

(60) Provisional application No. 60/229,892, filed on Sep. 1, 2000.

(51) Int. Cl.
| C09K 19/20 | (2006.01) |
| C09K 19/34 | (2006.01) |
| C07C 69/76 | (2006.01) |
| C07C 25/13 | (2006.01) |
| C07D 239/02 | (2006.01) |

(52) U.S. Cl. ............ 428/1.1; 252/299.61; 252/299.64; 252/299.65; 560/65; 560/83; 560/85; 570/127; 570/129; 544/303; 544/334

(58) Field of Classification Search ............... 428/1.1, 428/1.3; 252/299.01, 299.65, 299.67, 299.64, 252/299.61; 544/303, 334; 560/65, 83, 560/85; 570/127, 129
See application file for complete search history.

(56) References Cited

U.S. PATENT DOCUMENTS

| 4,367,924 A | 1/1983 | Clark et al. ............... 350/334 |
| 4,886,619 A | 12/1989 | Janulis .................... 252/299.1 |
| 5,062,691 A | 11/1991 | Tristani-Kendra et al. .... 359/56 |
| 5,082,587 A | 1/1992 | Janulis ................... 252/299.01 |
| 5,110,497 A * | 5/1992 | Suzuki et al. .......... 252/299.65 |
| 5,169,556 A | 12/1992 | Mochizuki ............. 252/299.62 |
| 5,254,747 A | 10/1993 | Janulis ....................... 568/650 |
| 5,262,082 A | 11/1993 | Janulis et al. .......... 252/299.01 |
| 5,275,757 A | 1/1994 | Mineta et al. ......... 252/299.61 |
| 5,322,639 A | 6/1994 | Kawabata et al. ..... 252/299.62 |
| 5,327,273 A | 7/1994 | Beresmev et al. .......... 359/104 |
| 5,340,498 A | 8/1994 | Arai et al. ............. 252/299.65 |
| 5,346,646 A | 9/1994 | Kawabata et al. ..... 252/299.62 |
| 5,348,685 A | 9/1994 | Mochizuki et al. .... 252/299.62 |
| 5,352,379 A | 10/1994 | Nishiyama et al. .... 252/299.62 |
| 5,367,391 A | 11/1994 | Johno et al. ................. 359/56 |
| 5,374,375 A | 12/1994 | Yui et al. .............. 252/299.65 |
| 5,377,033 A | 12/1994 | Radcliffe .................... 359/75 |
| 5,378,396 A | 1/1995 | Yui et al. .............. 252/299.65 |
| 5,389,287 A | 2/1995 | Nishiyama et al. .... 252/299.01 |
| 5,399,291 A | 3/1995 | Janulis et al. .......... 252/299.01 |
| 5,399,701 A | 3/1995 | Janulis ....................... 546/298 |
| 5,417,883 A | 5/1995 | Epstein et al. ......... 252/299.01 |
| 5,437,812 A | 8/1995 | Janulis et al. .......... 252/299.01 |
| 5,455,697 A | 10/1995 | Coles et al. ................ 359/103 |
| 5,474,705 A | 12/1995 | Janulis et al. .......... 252/299.01 |
| 5,482,650 A | 1/1996 | Janulis et al. .......... 252/299.01 |
| 5,498,368 A | 3/1996 | Coles .................... 252/294.67 |
| 5,529,718 A | 6/1996 | Hornung et al. ....... 252/299.61 |
| 5,534,190 A | 7/1996 | Johno et al. ........... 252/299.65 |
| 5,543,078 A | 8/1996 | Walba et al. ........... 252/299.65 |
| 5,547,604 A | 8/1996 | Coles et al. ............ 252/299.01 |
| 5,568,299 A | 10/1996 | Yoshihara et al. .......... 359/100 |
| 5,583,682 A | 12/1996 | Kitayama et al. ........... 349/172 |
| 5,595,682 A | 1/1997 | Goodby et al. ........ 252/299.01 |
| 5,658,491 A | 8/1997 | Kistner et al. ......... 252/299.01 |
| 5,660,762 A | 8/1997 | Ito et al. ................ 252/299.67 |
| 5,695,683 A | 12/1997 | Takeichi et al. ....... 252/299.61 |
| 5,702,637 A | 12/1997 | Johnson et al. ........ 252/299.61 |
| 5,719,653 A | 2/1998 | Minato et al. ............... 349/156 |
| 5,723,069 A | 3/1998 | Mineta et al. ......... 252/299.67 |
| 5,728,864 A | 3/1998 | Motoyama et al. ........... 560/59 |
| 5,748,164 A | 5/1998 | Handschy et al. ............ 345/89 |
| 5,750,214 A | 5/1998 | Ito et al. ....................... 428/1 |
| 5,770,108 A | 6/1998 | Totani et al. ........... 252/299.61 |
| 5,808,800 A | 9/1998 | Handschy et al. ........... 359/630 |
| 5,827,448 A | 10/1998 | Konuma et al. ....... 252/299.61 |
| 5,855,812 A | 1/1999 | Radcliffe et al. ...... 252/299.01 |
| 5,855,813 A | 1/1999 | Coles et al. ............. 252/299.5 |
| 5,856,815 A | 1/1999 | Mochizuki et al. ........... 345/97 |
| 5,858,273 A | 1/1999 | Asaoka et al. ........... 252/299.4 |
| 5,861,108 A | 1/1999 | Ishida et al. ........... 252/299.62 |
| 5,861,109 A | 1/1999 | Goodby et al. ........ 252/299.65 |

(Continued)

FOREIGN PATENT DOCUMENTS

EP        405868 A2     2/1991

(Continued)

OTHER PUBLICATIONS

CAPLUS 1998: 624749.*

(Continued)

*Primary Examiner*—Shean C Wu
(74) *Attorney, Agent, or Firm*—Faegre & Benson, LLP

(57) ABSTRACT

The invention provides LC compositions that exhibit V-shaped switching when aligned in an analog device configuration and exhibit bistability when aligned in a bookshelf-type device configuration. The invention more specifically provides LC compositions of formula 1 and particularly chiral nonracemic compounds of formula 1 which exhibit bistable switching as well as V-shaped switching when aligned in appropriate device configurations. The invention also provides methods of using the compounds of the invention in making LC compositions and electooptical devices comprising an aligned layer of the compositions of this invention.

52 Claims, 2 Drawing Sheets

U.S. PATENT DOCUMENTS

| | | | |
|---|---|---|---|
| 5,888,420 A | 3/1999 | Sakai et al. | 252/299.01 |
| 5,922,242 A | 7/1999 | Saishu et al. | 252/299.62 |
| 5,928,562 A | 7/1999 | Kistner et al. | 252/299.6 |
| 5,936,689 A | 8/1999 | Saishu et al. | 349/123 |
| 5,938,973 A | 8/1999 | Motoyama et al. | 252/299.65 |
| 5,942,155 A | 8/1999 | Coles et al. | 252/299.64 |
| 5,943,112 A | 8/1999 | Mochizuki et al. | 349/173 |
| 5,949,391 A | 9/1999 | Saishu et al. | 345/50 |
| 5,951,914 A | 9/1999 | Matsumoto et al. | 252/299.67 |
| 5,968,413 A | 10/1999 | Mine et al. | 252/299.65 |
| 5,972,241 A | 10/1999 | Johnson et al. | 252/299.61 |
| 5,972,243 A | 10/1999 | Mine et al. | 252/299.65 |
| 5,976,409 A | 11/1999 | Mineta et al. | 252/299.65 |
| 5,980,780 A | 11/1999 | Motoyama et al. | 252/299.64 |
| 5,985,172 A | 11/1999 | Motoyama et al. | 252/299.64 |
| 6,001,278 A | 12/1999 | Matsumoto et al. | 252/299.65 |
| 6,002,042 A | 12/1999 | Mine et al. | 560/66 |
| 6,007,737 A | 12/1999 | Nishiyama et al. | 252/299.01 |
| 6,018,070 A | 1/2000 | Ito et al. | 560/76 |
| 6,019,911 A | 2/2000 | Hirano et al. | 252/299 |
| 6,045,720 A | 4/2000 | Shundo et al. | 252/299.61 |
| 6,051,639 A | 4/2000 | Mehl et al. | 524/205 |
| 6,057,007 A | 5/2000 | Amano et al. | 428/1 |
| 6,084,649 A | 7/2000 | Amano et al. | 349/96 |

FOREIGN PATENT DOCUMENTS

| | | |
|---|---|---|
| EP | 255236 | 5/1994 |
| EP | 425304 B1 | 7/1996 |
| EP | 579545 B1 | 12/1997 |
| EP | 736078 B1 | 6/1998 |
| JP | A-1-213390 | 8/1989 |
| JP | A-1-316339 | 12/1989 |
| JP | A-1-316367 | 12/1989 |
| JP | A-1-316372 | 12/1989 |
| JP | 8082778 A | 3/1996 |
| JP | 8-113784 * | 5/1996 |
| JP | A-1-228128 | 8/2000 |
| WO | WO 91/00897 | 1/1991 |
| WO | WO 97/36908 | 10/1997 |
| WO | WO 99/33814 | 7/1999 |
| WO | WO 00/31210 | 6/2000 |

OTHER PUBLICATIONS

CAPLUS 2001: 305417.*

English abstract of JP 8-113784, 1986.*

Chao et al. "Unusual Thickness-Dependent Thermal Behavior and Anticlinic Coupling in Chiral Smectic Free-Standing Liquid-Crystal Films", Phys. Rev. Let., vol. 86, No. 18, pp. 4048-4051, 2001.*

U.S. Appl. No. 09/653,437, filed Sep. 1, 2000, Xue et al.

Arnett, K.E.et al., "Technique For Measuring Electronic-Based Electro-Optic Coefficients of Ferroelectric Liquid Crystals" (1995), *Mat. Res. Soc. Symp. Proc.* 392:135-146.

Blinov L.M.and Tournilhac, F., "Infra-Red Dichroism of Mesophases Formed By Polyphilic Molecules. 1. Development of the Technique and Study of Compounds With One Long Perfluorinated Tail"(1993), *Molecular Materials* 3(1):93-111.

Booth, C.J. et al., "The ferro-, ferri- and antiferro-electric properties of a series of novel 2- or 3-substituted-alkyl 4-(4'-dodecyloxybiphenyl-4-carbonyloxy)-benzoate esters" (1996), *Liquid Crystals* 20(6):815-823.

Booth, C.J. et al., "Achiral swallow-tailed materials with 'antiferroelectric-like' structure and their potential use in antiferroelectric mixtures" (1996), *Liquid Crystals* 20(4):387-392.

Chandani, A.D. et al., "Novel Phases Exhibiting Tristable Switching" (Jul. 1989), *Jpn. J. App. Phys.* 28:L1261-1264.

Chandani, A.D. et al., "Antiferroelectric Chiral Smectic Phases Responsible for the Tristable Switching in MHPOBC"(Jul. 1989), *Jpn. J. App. Phys.* 28:L1265-1268.

Chandani, A.D. et al., "Tristable Switching in Surface Stabilized Ferroelectric Liquid Crystals with a Large Spontaneous Polarization" (May 1988), *Jpn. J. App. Phys.* 27(5):L729-L732.

Clark, N.A. and Lagerwall, S.T., "Submicrosecond bistable electro-optic switching in liquid crystals"(Jun. 1980), *Appl. Phys. Lett.* 36:899.

Dawson, D.J. et al., "Cocyclotrimerization of Aryl Acetylenes: Substituent Effects on Reaction Rate" *Am. Chem. Soc. Sym.* 346 Ch 38:446-456.

de Vries, A., "Experimental Evidence Concerning Two Different Kinds Of Smectic C To Smectic A Transitions" (1977), *Mol. Cryst. Liq. Cryst. (Letters)* 41:27-31.

de Vries, A., "The Implications of the Diffuse-Cone Model for Smectic A and C Phases and A-C Phase Transitions" (1979), *Mol. Cryst. Liq. Cryst (Letter).* 49:179-185.

Drzewinski, W. et al. "Antiferroelectric Liquid Crystals with Fluorinated Parts of Terminal Chains" CAPLUS 1998:624787.

Edgar, K. J. and Falling, S.N., "An Efficient and Selective Method for the Preparation of Iodophenols" (1990) *Org. Chem.* 55:5287-5291.

Fleming, F. F. and Jiang, T., "Unsaturated Nitriles: Optimized Coupling of the Chloroprene Grignard Reagent[1] with w-Bromonitriles" *J. Org. Chem.* (1997) 62:7890-7891.

Gorecka, E. et al., "Molecular Orientational Structures in Ferroelectric, Ferrielectric and Antiferroelectric Smectic Liquid Crystal Phases as Studied by Conoscope Observation" (Jan. 1990), *Jap. J. Appl. Phys.* 29(1):L131-L137.

Hartmann, W., "Uniform SSFLC Director Pattern Switching" (1988), *Ferroelectrics* 85:67-77.

Heinemann, S. et al., "Synthesis and Dielectric Investigations of New Swallow-Tailed Monomers and Polymers" (1993), *Mol. Cryst. Liq. Cryst.* 237:277-283.

Heinemann, S. et al., "Competition between dipolar and steric interactions in swallow-tailed compounds" (1993), *Liquid Crystals* 13(3):373-380.

Hide, F. et al., "Dynamic Polarized Infrared Spectroscopy of Electric Field-Induced Molecular reorientation in a Chiral Smectic-A Liquid Crystal" (Sep. 1995), *Phys. Rev. Lett.* 75:2344-2347.

Inui, S. et al., "Thresholdless antiferroelectricity in liquid crystals and its application to displays"(1996), *J. Mater. Chem.* 6(4):671-673.

Johno, M. et al., "Correspondence between Smectic Layer Switching and DC Hysteresis of Apparent Tilt Angle in an Antiferroelectric Liquid Crystal Mixture" (Jan. 1990)), *Jap. J. Applied Phys.* 29:L111-114.

Johno, M. et al., "Smectic Layer Switching by an Electric Field in Ferroelectric Liquid Crystals Cells" (Jan. 1989), *Jpn. J. App. Phys.* 28:L119-120.

Kagawa, A. et al., "Fast Response Time STN=LCD with High Contrast Ratio" (1995), *Proceedings of the 15th International Display Research Conference* 177-180.

Klopper et al., "IR-Modulation Spectroscopy on the Collective Dynamics of Free-Standing Ferroelectric Liquid Crystalline Films" (Jan. 1997), *J. Physique II* 7(1):57-67.

Matsumoto, T. et al., "A novel property caused by frustration between ferroelectricity and antiferroeclectricity and its application to liquid crystal displays—frustoelectricity and V -shaped switching" (Sep. 1999) *J. Mater. Chem.* 9:2051-2080.

Mikami, K. et al., "Binaphthol-Titanium Complex-Catalyzed Fluoral-Ene Reaction with Vinyl Sulfides for Asymmetric Synthesis of Diastereomeric a Trifluoromethyl-b-methyl Carbinols: Diastereomer Switch of Antiferroelectric or Ferroelectric Properties of Diastereomeric Liquid-Crystalline Systems[1]" (Sep. 1996) *SYNLETT* 837-838.

Mochizuki, A. et al., "A High Contrast and High Transmittance Multiplexing SSFLC Display Utilizing Naphthalene Base Liquid Crystal Materials" (1991), *Ferroelectrics* 122:37-51.

Mottram, N.J. and Elston, S.J., "Preliminary communication Thresholdless switching induced by polar anchoring in antiferroelectric liquid crystals" (1999) *Liquid Crystals* 26 (12):1853-1856.

Nakagawa, A., A Hysteresis Model for Antiferroelectric $SmC_{A^*}$ (Aug. 1991), *Jap. J. App. Phys.* 30:L1759-1764.

Ostrovskii, B.I. et al., "Evidence of Tilted Dimeric Mesophase for Terminally Polar Polyphilic Mesogens" (1995), *J. Physique II* 5(7):979-1001.

Park, B. et al., "Molecular motion in a smectic liquid crystal showing V-shaped switching as studied by optical second-harmonic generation" (Apr. 1999) *Physical Review E* 59(4) 3815-3818.

Perova, T.S. et al., "Study Of The Molecular Orientation In A Chiral Smectic Liquid Crystal Mixture using Infrared Dichroism" (1996), *Ferroelectrics* 180(1-4):105-115.

Redmond, M. et al., "Ferroelectric and Electroclinic Characterisation of a New Organic Siloxane Bimesogen." (1992) *Ferroelectrics* 148:323-336.

Rieker, T.P. et al., ""Chevron" Local Layer Structure in Surface-Stabilized Ferroelectric Smectic-C Cells" (Dec. 1987), *Physical Rev. Letts.* 59(23):2658-2661.

Rudquist, J.P. et al., "The case of thresholdless antiferroelectricity: polarization-stabilized twisted SmC* liquid crystals give V-shaped electro-optic response" (1999), *J. Mater. Chem.* 9:1257-1261.

Sakaigawa, A. and Nohira, H., "Properties of Ferroelectric Liquid Crystal Mixtures Containing Fluorine Substituted Compounds"(1993) *Ferroelectrics* 148:71-78.

Schmitt, K. et al., "Strongly non- linear optical ferroelectric liquid crystals for frequency doubling" (1993) *Liquid Crystals* 14(6) 1735-1752.

Seomun, S.S. et al., "Evolution of Switching Characteristics from Tristable to V-Shaped in an Apparently Antiferroelectric Liquid Crystal" (Jun. 1997), *J. Appl. Phys.* 36:3586-3590.

Takanishi, Y. et al., "Spontaneous Formation of Quasi-Bookshelf Layer Structure in New Ferroelectric Liquid Crystals Derived from a Naphthalene Ring" (Jun. 1990), *Jap. J. Applied Phys.* 29(6):L984-L986.

Tuffon, R. P., "Non-Chiral Compounds Exhibiting Alternating Tilt Smectic Phases" (1995) *Mol. Cryst. Liq. Cryst.* 260:51-67.

Zhuang, Z., "Interfacial Interactions, Director Configurations and Layer Structures of Surface Stabilized Ferroelectic Liquid Crystals" (1991), *Ph.D. Thesis University of Colorado, Boulder CO.* 105 pages.

US 6,030,547, 02/2000, Hasegawa et al. (withdrawn)

* cited by examiner

PARTIALLY FLUORINATED LIQUID CRYSTAL MATERIAL

CROSS-REFERENCE TO RELATED APPLICATIONS

This application takes priority under 35 U.S.C. 119(e) from U.S. provisional application 60/229,892 filed Sep. 1, 2000 which is incorporated by reference herein to the extent that it is not inconsistent with the disclosure of this application

BACKGROUND OF THE INVENTION

The present invention relates generally liquid crystal compounds and compositions and to optical devices employing liquid crystal compositions in optical switching and display elements. The invention more specifically relates to antiferroelectric liquid crystal compositions and improved liquid crystal compositions that exhibit V-shaped switching and bistable switching exhibiting very fast switching speeds and wide view angles useful in the preparation of LC optical devices. The invention also relates to analog and bistable LC optical devices that employ these compositions and which exhibit very fast switching speeds and wide view angles.

Several types of smectic liquid crystal materials (LCs) have been investigated for rapid switching, view-angle enhancement and higher contrast, including surface-stabilized ferroelectric LCs (FLCs), deformed helix ferroelectric LCs (DHFLCs), and antiferroelectric LCs (AFLCs). Recently, smectic material exhibiting thresholdless or more properly V-shaped switching LCs (VLCs) have been described (Inui, S. et al. (1996) J. Mater. Chem. 6(4): 671–673; Seomun, S. S. et al. (1997) Jpn. J. Appl. Phys. 36:3580–3590).

Liquid crystal (LC) compositions exhibit one or more LC phases. LC compositions may be composed of one or more components. Components of LC compositions may exhibit liquid crystal phases, have latent liquid crystal phases or be compatible with (not suppress) liquid crystal phases in the LC composition. LC compounds and components of LC mixtures of this invention are rod-like molecules most typically having a generally linear mesogenic core with one or more directly or indirectly linked alicyclic or aromatic rings (which may be fused aromatic rings) and linear or branched tail groups distributed on either side of the mesogenic core, e.g.:

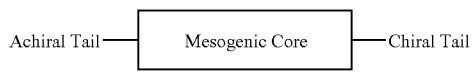

LC components which do not themselves exhibit liquid crystal phases, but which exhibit LC phases on combination with one or more other components are described as having "latent" liquid crystal phases. Chiral nonracemic LCs useful in FLC, DHFLC, AFLC and VLC compositions have at least one component that has a chiral non-racemic tail group. FLC, DHFLC, AFLC and VLC compositions may be composed entirely of chiral non-racemic components, but are typically composed of a mixture of chiral nonracemic and achiral or racemic components.

Ferroelectric LCs when aligned parallel to the substrate surfaces using the surface stabilized effect (in an surface-stabilized ferroelectric liquid crystal (SSFLC) device) exhibit two stable state switching on a microsecond time scale. Antiferroelectric LCs exhibit three stable-state switching, which by application of a bias field can be converted for use in a bistable switching mode LC devices. Two of the AFLC states have the same transmittance, so that alternate symmetrical switching can be used in AFLC devices. VLCs, in contrast, exhibit very rapid, analog electro-optic response, allow symmetrical driving, and no dc balance is required. VLCs are particularly attractive for applications requiring generation of multiple levels of gray scale.

High quality full color images in a flat panel display requires at least sixteen levels of gray scale. Temporal gray scale or partial domain switching techniques have been used to adapt bistable state FLC devices to multiple level gray scale applications. However, the number of gray levels that can be generated with such methods is limited. An electroclinic effect, that has been observed in certain chiral non-racemic LC compositions possessing a smectic A phase, has also been employed to generated multiple gray scale levels. In an electroclinic LC device, application of an electric field to the LC in the chiral smectic A phases induces the LC molecules to tilt. The tilt angle is linearly proportional to the applied electric field and results in the generation of analog gray scale. The induced tilt angle is, however, temperature dependent and the maximum tilt angle available in most electroclinic compositions is small requiring temperature control and limiting device contrast. In contrast, LC compositions exhibiting V-shaped switching can exhibit large tilt angles that are insensitive to temperature, and have minimal hysteresis and minimal LC defects. These properties allow construction of LC devices with very fast response time, large viewing angle and high contrast.

V-shaped LC compositions and components of such compositions are useful in a variety of optical device applications, including, in particular, active matrix and thin film transistor display applications (e.g., flat-panel displays, computer monitors, head-mounted displays, cellular phone viewers), in analog beam deflectors (which can, e.g., replace spinning mirrors in bar code scanners), for optical correlation, and for on-the-fly adaptive optics (for use, e.g., in astronomy and robotic vision).

The thresholdless effect was first observed by Inui et al. (1996) J. Mater. Chem. 6:671 in a three component antiferroelectric LC mixture of compounds A:B:C (40:40:20 mass %):

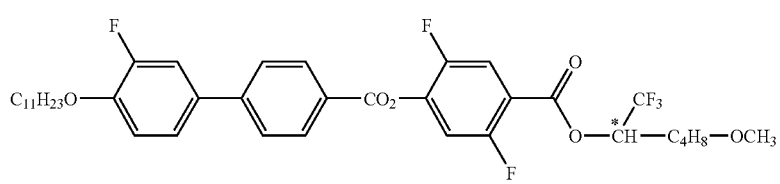

A

-continued

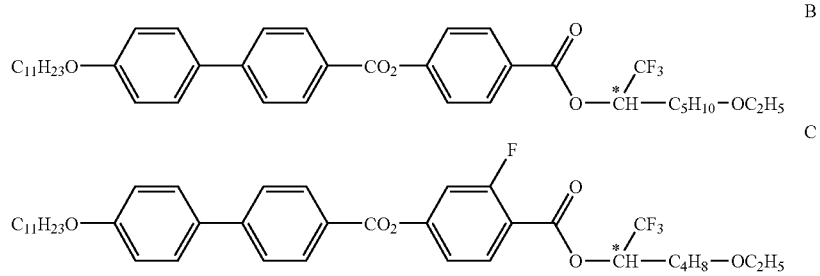

It was later reported by Seong et al. (1997) J. Appl. Phys. 36:3586–3590 that compound A in this mixture when homogeneously aligned in an LC cell exhibited V-shaped switching in an antiferroelectric phase at certain temperatures.

Several models have been proposed to explain V-shaped switching. In one model, based on the association of V-shaped switching with LCs having antiferroelectric phases, a distinct type of antiferroelectric phase is proposed to be the origin of V-shaped switching (Matsumoto T., et al. (1999) J. Mater. Chem. 9:2051–2080). In this phase, the LC molecules within a layer are uniformly tilted, but the tilt direction of each layer is randomly distributed, rather than layer correlated as in the ordinary antiferroelectric phase. The analog electrooptic response results when LC molecules having different relative tilt orientation respond differently to an applied field. As the field is increased more and more molecules align with the applied field until the LC material reaches the ferroelectric state. The randomly tilted phase was designated a thresholdless antiferroelectric liquid crystal (TAFLC) phase.

In another model, the V-shaped switching phase is described as a chevron-type smectic C phase (Parl, B. et al. (1999) Physical Review 59(4):R3815). In this model at zero field, the LC molecules are uniformly aligned along the chevron interface. When an electric field is applied the LC molecules rotate back and forth along a half cone about their aligned orientation. Molecules rotate differently above and below the chevron interface resulting in an analog electrooptic response with increasing field.

A third model is based on an experimental determination that V-shaped switching can occur in a randomly tilted smectic C phase which is aligned in a bookshelf layer structure between parallel substrates (Two Clarke et al. references). In this model, V-shaped switching depends upon the ability of the LC to form a bookshelf layer structure and high spontaneous polarization (Ps) of the LC. In the bookshelf geometry with LC molecules exhibiting high Ps, the polarization orients as a uniform block. When an electric field is applied the uniform polarization block responds by azimuthal orientation of Ps on the tilt cone. Bookshelf geometry has previously been described in a class of naphthalene type LCs (U.S. Pat. No. 5,348,685 and Mochizuki et al. (1991) Ferroelectrics 122:37–51). A bookshelf layer structure can be formed in the smectic C phase when there is little or no shrinkage of the layer spacing on transition from the smectic A phase to the smectic C phase. Materials which exhibit a "deVries" type smectic A phase will form bookshelf layer geometry (U.S. provisional application, 60/151,974, filed Sep. 1, 1999, U.S. application Ser. No. 09/653,437, filed Sep. 1, 2000 which is incorporated by reference in its entirety herein). A de Vries smectic A phase (the existence of which was first suggested by de Vries, A. (1977) Mol. Cryst. Liq. Cryst. 41:27 and de Vries, A. (1979) Mol. Cryst. Liq. Cryst. 4:179) consists of LC molecules whose directors are tilted with respect to the layer normal (rather than parallel to the layer normal in a regular smectic A phase). However, the titled LC molecules are randomly oriented with respect to each other such that the average director of the LC is parallel to the layer normal. There is little shrinkage on transition from a de Vries smectic A to a smectic C because the LC molecules are already tilted. This third model suggests that V-shaped switching will be associated with LC molecules which exhibit a de Vries smectic A phase and possess high Ps.

U.S. Pat. No. 6,045,720 relates to LC compounds having the chiral tail:

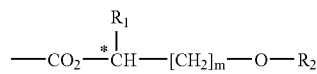

where $R_1$ is $CH_3$, $CF_3$, $CH_2F$, $CHF_2$, m is 2–12 and $R_2$ is an alkyl group having 1–10 carbon atoms with three-ring mesogenic cores which exhibit an antiferroelectric phase. The mesogenic core can contain phenyl, various F-substituted phenyl, pyridine rings and cyclohexy rings. The achiral tail is an alkyl or alkoxy group. Certain compounds of the invention are reported to exhibit low threshold switching.

Several models have been proposed to explain V-shaped switching. In one model, based on the association of V-shaped switching with LCs having antiferroelectric phases, a distinct type of antiferroelectric phase is proposed to be the origin of V-shaped switching.

U.S. Pat. No. 5,938,973 relates to certain ferrielectric LC compositions containing certain swallow-tailed LC compounds. The composition also contains certain chiral LC compounds having a chiral tail group of Formula D:

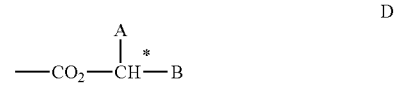

where A is $CF_3$ and B is certain ether groups. The mesogenic core is a phenyl benzoate core which may be substituted with one fluorine and the other tail group is an alkoxy group. The reference reports an apparently continuous change in transmission in on application of voltage between 0 and 4 volts. It is suggested that the continuous change in transmission as a function of voltage results because the threshold voltage between ferroelectric and antiferroelectric states in the LC composition is "not distinct."

U.S. Pat. No. 5,728,864 relates to LC compounds or compositions having a ferrielectric phase. The LC compounds have a biphenyl benzoate core optionally substituted with one fluorine with a chiral tail of formula D where A is $CF_3$ or $C_2F_5$ and B is certain ether and an achiral tail that is a linear alkoxy group.

U.S. Pat. No. 6,002,042 relates to compounds having an antiferroelectric or a ferrielectric phase that are biphenyl benzoates optionally substituted with one fluorine with a chiral tail group of formula D where A is $CF_3$ and B is certain alkyl groups and the other tail group is a linear alkoxy group.

A number of additional compounds having biphenyl benzoate cores and the same or a similar chiral or achiral tail group D (above) where A is —$CF_3$, —$CH_3$, —$C_2H_5$, and B is various alkyl or ether groups and when the compound is chiral * indicates the chiral carbon. U.S. Pat. No. 5,340,498 relates to compounds having certain fluorine substitution on the phenyl benzoate core and ether groups.

U.S. Pat. Nos. 5,980780 and 5,985,172 relate to antiferroelectric LC compositions containing certain racemic phenyl benzoate compounds in combination with compounds having a biphenyl benzoate core optionally substituted with one fluorine and having a chiral tail of formula D where A is —$CF_3$ or —$CH_3$ and B is certain alkyl or ether tails.

U.S. Pat. No. 6,018,070 relates to antiferroelectric LC compounds (which may be optically active) having a two-ring phenyl ester core which may have certain fluorine substituents on the ring where one tail is an alkyl ester and the other tail is the tail of formula D where A is —$CH_3$ or —$CF_3$ and B can be certain alkyl or ether groups.

U.S. Pat. No. 6,001,278 relates to certain antiferroelectric LC compositions containing certain swallow-tailed LC compounds. The composition also contains certain antiferroelectric LC compounds having a chiral tail group of Formula D where A is $CH_3$ or $CF_3$ and B is certain alkyl or ether groups. The mesogenic core is a phenyl benzoate core which may be substituted with one fluorine and the other tail is an alkyl ester tail.

SUMMARY OF THE INVENTION

In one aspect this invention relates to antiferroelectric liquid crystal (LC) compositions exhibiting very fast switching speeds, preferably faster than 1 msec and wide view angles, preferably greater in magnitude than 70°, useful in the preparation of LC optical devices. In another aspect the invention relates to liquid crystal compositions which exhibit V-shaped switching with very fast switching speeds and wide view angles useful in the preparation of analog LC optical devices. LC compositions of this invention exhibiting V-shaped switching can also exhibit bistable switching in appropriate device configurations. The invention also relates to analog and bistable LC optical devices that employ the antiferroelectric and V-shaped switching compositions of this invention. LC-based devices employing the compositions of this invention can be operated at low driving voltages (<3V/μtm) and at high frequency (>10 Hz). LC-based devices of this invention can also be operated using a symmetrical driving scheme thereby affording DC balance.

Antiferroelectric liquid crystal compositions of this invention comprise one or more chiral non-racemic compounds of the formula:

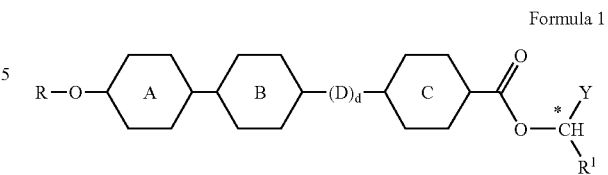

Formula 1 where:
R is a linear or branched perfluorinated or partially fluorinated alkyl group ($R^F$), a linear, cyclic or branched perfluorinated or partially fluorinated ether group or a linear or branched ether group;
Rings A, B and C are 6-carbon aromatic rings each optionally substituted with from one to four fluorines and wherein one or two CH groups in the rings can be substituted with a N;
d is 0 or 1;
D is a linker group selected from the group consisting of —COO—, —OOC—, —$CH_2$—$CH_2$—, a cis or trans double bond, or a triple bond, when d is 0 rings B and C are linked through a single bond;
Y is an alkyl or fluorinated alkyl group having from one to six carbon atoms; and
$R^1$ is a nonchiral tail group selected from linear or branched alkyl groups where one or more non-neighboring $CH_2$ groups can be replaced with an —O—, —S—, —Si(R')$_2$—, —Si(R')$_2$—$(CH_2)_P$—Si(R')$_2$—, where p is an integer ranging from 1 to 6, —Si(R')$_2$—O—, —Si(R')$_2$—O—Si(R')$_2$—O—, a cis or trans double bond or a triple bond, wherein each $R^1$, independent of other R', is an alkyl or fluorinated alkyl group having from one to six carbon atoms and wherein the $R^1$ tail group is optionally substituted with one or more fluorines.

Rings A, B and C are exemplified by those in Scheme 1. Various A-B ring combinations are exemplified in Scheme 2. Various core structures containing rings A, B and C are illustrated in Scheme 3. Although only trans —$CH_2$=$CH_2$— linked cores are illustrated in Scheme 3, the corresponding cis-linked cores can also be employed in mixtures of this invention.

LC compositions of this invention include those of comprising one or more compounds of Formula 1 in which:
R is a perfluorinated or partially fluorinated ether;
R is an ether group;
R is $R^F$;
R=$R^F$ is a partially fluorinated alkyl group having from 1 to about 20 carbon atoms;
R=$R^F$ is a partially fluorinated alkyl group having from 3 to about 20 carbon atoms;
R=$R^F$ has the formula: $C_nF_{2n+1}C_mH_{2m}$— wherein n is an integer ranging from 1 to about 10 and m is an integer ranging from 0 to about 10;
R=$R^F$ has the formula: $C_nF_{2n+1}C_mH_{2m}$— wherein n is an integer ranging from 1 to about 10 and m is an integer ranging from 0 to about 10;
R=$R^F$ is $C_nF_{2n+1}$—$C_mH_{2m+1}$— wherein n and m are 4–6;
One of rings A, B or C is a pyrimidine;
One of rings A, B or C is a pyridine;
All of rings A, B and C are optionally substituted phenyls;
One of rings A, B and C are substituted with one or two fluorines;

Two of rings A, B and C are substituted with one or two fluorines;
One of rings A, B and C are substituted with two fluorines;
d is 1 and D is —OOC—;
d is 1 and D is —COO—;
d is 1 and D is —CH$_2$—CH$_2$—
d is 1 and D is a trans double bond;
d is 0;
Y is a small alkyl or fluorinated alkyl group having from 1 to 3 carbon atoms;
Y is CF$_3$— or C$_2$F$_5$—;
Y is CF$_3$;
Y is a small alkyl group having from 1 to 3 carbon atoms;
Y is CH$_3$—;
Y is C$_2$H$_5$—;
Y is C$_3$H$_7$—;
R$^1$ is a group having 3 to 20 carbon atoms;
R$_1$ is a linear or branched alkyl group having from 1 to 20 carbon atoms;
R$_1$ is a linear alkyl group having from 5 to 10 carbon atoms;
R$_1$ is a branched alkyl group having from 5 to 10 carbon atoms;
R$_1$ is an ether group having 1 to 3 oxygen atoms;
R$_1$ is a thioether group having 3 to 20 carbon atoms;
R$_1$ is an alkene group having 3 to 20 carbon atoms;
R$_1$ is an alkyne group having 3 to 20 carbon atoms;
R$_1$ is an alkyl group having from 3 to about 10 carbon atoms;
R$_1$ is an alkyl group optionally substituted with one or more fluorines and having from 1 to about 20 carbon atoms;
R$_1$ is an olefin containing one or two cis or trans double bonds;
R$_1$ contains at least one Si atom;
R$_1$ contains a —Si(R')$_2$—(CH$_2$)$_p$—Si(R')$_2$— group where p is 1–6 and R' is a small alkyl group having from 1 to 3 carbon atoms;
R$_1$ contains a —Si(R')$_2$—CH$_2$—Si(R')$_2$— group where R' is a small alkyl group having from 1 to 3 carbon atoms;
R$_1$ contains a —Si(R')$_2$—O— group where R' is a small alkyl group having from 1 to 3 carbon atoms;
R$_1$ contains a —Si(R')$_2$—O—Si(R')$_2$— group where R' is a small alkyl group having from 1 to 3 carbon atoms;
R$_1$ is a partially fluorinated alkyl group having from 1 to 20 carbon atoms;
R$_1$ is a perfluorinated alkyl group having from 1 to 20 carbon atoms; or any combination of A, B or C rings, linking group D, R, R$^F$, R$^1$ and Y as above-defined.

In specific embodiments; the liquid crystal compounds of this invention comprise one or more chiral non-racemic compounds of Formula 1 in which R is R$^F$ and:
R$^F$ is a partially fluorinated tail of the formula: C$_n$F$_{2n+1}$C$_m$H$_{2m}$— where n and m range from 1 to about 10 and R$^1$ is an alkyl group having from 3 to about 10 carbon atoms;
R$^F$ is a partially fluorinated tail group of formula C$_n$F$_{2n+1}$C$_m$H$_{2m}$— where n and m range from 1 to about 10, Y is CF$_3$— and R$^1$ is an alkyl group having from 3 to about 10 carbon atoms;
R$^F$ is a partially fluorinated tail of the formula: C$_n$F$_{2n+1}$C$_m$H$_{2m}$— where n and m range from 1 to about 10 and rings A and B together form a biphenyl group;
R$^F$ is a partially fluorinated tail of the formula: C$_n$F$_{2n+1}$C$_m$H$_{2m}$— where n and m range from 1 to about 10 and rings A and B together form a phenyl pyridine group;
R$^F$ is a partially fluorinated tail of the formula: C$_n$F$_{2n+1}$C$_m$H$_{2m}$— where n and m range from 1 to about 10 and rings A and B together form a phenyl pyrimidine group;
R$^F$ is a partially fluorinated tail of the formula: C$_n$F$_{2n+1}$C$_m$H$_{2m}$— where n and m range from 1 to about 10 and rings A and B together form a biphenyl group that is substituted with one to four fluorines;
R$^F$ is a partially fluorinated tail of the formula: C$_n$F$_{2n+1}$C$_m$H$_{2m}$— where n and m range from 1 to about 10 and rings A and B together form a phenyl pyridine group that is substituted with one to four fluorines; or
R$^F$ is a partially fluorinated tail of the formula: C$_n$F$_{2n+1}$C$_m$H$_{2m}$— where n and m range from 1 to about 10 and rings A and B together form a phenyl pyrimidine group that is substituted with one to four fluorines.

In other specific embodiments; the liquid crystal compounds of this invention comprise one or more chiral non-racemic compounds of Formula 1 in which R is an ether group which may contain one or more —O— and which may be fully or partially fluorinated. An ether group includes generally linear, branched or cyclic alkyl groups in which one or more —CH$_2$— groups are replaced with —O—. In this case R can include, but is not limited to:

C$_q$H$_{2q+1}$—O—C$_r$H$_{2r}$—, where q and r are integers from 1 to 20 and more preferably are integers from 3 to 8;
C$_q$H$_{2q+1}$—O—C$_r$H$_{2r}$—O—C$_s$H$_{2s}$—, where q, r and s are integers from 1 to 20 and more preferably are integers from 2 to 8;
C$_q$F$_{2q+1}$—O—C$_r$H$_{2r}$—, where q and r are an integers from 1 to 20 and more preferably are integers from 3 to 8;
C$_q$H$_{2q+1}$—O—C$_r$F$_{2r}$—, where q and r are integers from 1 to 20 and more preferably are integers from3 to 8;
C$_q$F$_{2q+1}$—O—C$_r$H$_{2r}$—O—C$_{H2s}$—, where q, r and s are integers from 1 to 20 and more preferably are integers from 2 to 8;
C$_q$H$_{2q+1}$—O—C$_r$F$_{2r}$—O—C$_s$H$_{2s}$—, where q, r and s are integers from 1 to 20 and more preferably are integers from 2 to 8;
C$_q$H$_{2q+1}$—O—C$_r$H$_{2r}$—O—C$_s$F$_{2s}$—, where q, r and s are integers from 1 to 20 and more preferably are integers from 2 to 8;
C$_q$F$_{2q+1}$—O—C$_r$F$_{2r}$—, where q and r are integers from 1 to 20 and more preferably are integers from 3 to 8; or
C$_q$F$_{2q+1}$—O—C$_r$F$_{2r}$—O—C$_s$F$_{2s}$—, where p, q and r are integers from 1 to 20 and more preferably are integers from 2 to 8.

LC compositions of this invention include those exhibiting an antiferroelectric phase and comprising one or more compounds of Formula 1 in which the mesogenic core formed by rings A, B, C and optional linker D is illustrated in Scheme 3. A subset of Compounds of Formula 1 of particular interest are those in which R is R$^F$ and the mesogenic core formed by rings A, B, C and optional linker D is illustrated in Scheme 3.

Liquid crystal compositions of this invention also include compositions exhibiting V-shaped switching and comprising one or more compounds of formula 1. LC compositions of this invention also include compositions that form layers with low angle where the chevron angle is less than or equal to about 18° as well as compositions that form layers that are substantially chevron-free (where the chevron angle is less than about 12°) in a surface stabilized ferroelectric LC (SSFLC) device. Liquid crystal compositions of this invention also include compositions that exhibit V-shaped switching when introduced into an analog LC device configuration and bistable switching when introduced into a surface-stabilized LC device.

Liquid crystal compositions of this invention include those comprising one or more compounds of Formula 1 and which exhibit properties improved for electrooptical applications. LC compositions include those that exhibit high polarization (Ps), i.e., Ps of 27 nC/cm$^2$ or greater or preferably a Ps of 40 nC/cm$^2$ or greater; those that exhibit fast rise times, i.e., 150 μsec or less, those that exhibit low viscosity of 200 mP*S or less; and those that exhibit desirable phases over broader temperature ranges, e.g., those exhibiting a smectic A phase which extends over a range of 20° C. or more, and those which exhibit desirable phases at temperatures that are more convenient for device operation (e.g., desirable phases at room temperature).

The invention further provides LC devices including bistable and analog devices which comprise LC compositions comprising one or more compounds of Formula 1. Of particular interest are optical devices which comprise an LC composition of this invention which exhibits V-shaped switching in an analog device configuration and bistable switching in a surface-stabilized device.

DETAILED DESCRIPTION OF THE INVENTION

Figure 1:
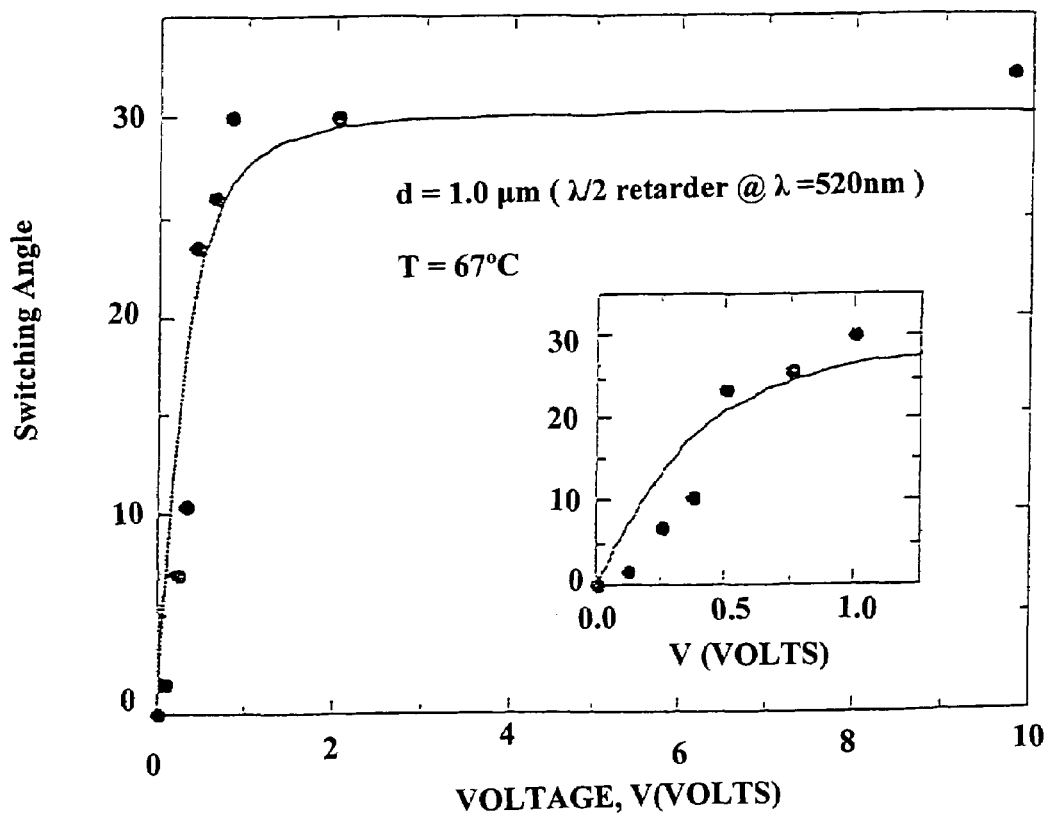
FIG. 1 is a graph illustrating the voltage dependence of switching angle in a representative compound of this invention, MDW 1228. The inset graph is an expansion of the switching angle dependence from 0 to 1.0 volt.

Preferred compositions of this invention for V-shaped switching include those compositions that comprise one or more compounds of this invention of formula 2A:

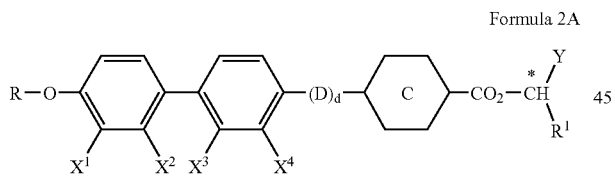

Formula 2A where variables take values as defined for formula 1 and in more specific embodiments:
R is a linear, branched or cyclic ether which may be perfluorinated ro partially fluorinated;
R=R$^F$ is a linear or branched fluorinated or partially fluorinated alkyl group;
X$^{1-4}$ are hydrogens or fluorines;
Ring C is a phenyl ring optionally substituted with from one to four fluorines and wherein one or two CH groups in the rings can be substituted with a N;
d is o or 1;
D is a linker group selected from the group consisting of —COO—, —OOC—, —CH$_2$—CH$_2$—, a cis or trans double bond, or a triple bond, when d is 0 rings B and C are linked through a single bond;
Y is an alkyl or perfluorinated alkyl group having from 1 to 6 carbon atoms; and R$^1$ is a nonchiral group selected from linear or branched alkyl groups where one or more non-neighboring CH$_2$ groups can be replaced with an —O—, —S—, —Si(R')$_2$—, —Si(R')$_2$—O—, —Si—(R')$_2$—(CH$_2$)p—Si(R')$_2$—, where p is an integer ranging from 1 to 6, —Si(R')$_2$—O—Si(R')$_2$—, a cis or trans double bond or a triple bond and wherein the R$^1$ tail group is optionally substituted with one or more fluorines.
Ring C is exemplified by those rings in Scheme1.
LC compositions of Formula 2A include those in which R is R$^F$ and:
R$^F$ is a partially fluorinated alkyl group having from 1 to about 20 carbon atoms;
R$^F$ is a partially fluorinated alkyl group having from 3 to about 20 carbon atoms;
R$^F$ has the formula: C$_n$F$_{2n+1}$C$_m$H$_{2m}$ wherein n is an integer ranging from 1 to about 10 and m is an integer ranging from 0 to about 10;
R$^F$ has the formula: C$_n$F$_{2n+1}$C$_m$H$_{2m}$— wherein n is an integer ranging from 1 to about 10 and m is an integer ranging from 0 to about 10;
R$^F$ is C$_n$F$_{2n+1}$—C$_m$H$_{2m}$— wherein n and m are 4–6;
Ring C is a phenyl ring;
Ring C is a pyrimidine;
Ring C is a pyridine;
Ring C is substituted with one or two fluorines;
d is 1 and D is —OOC—;
d is 1 and D is —COO—;
d is 0;
X$^1$ and X$^2$ are F and X$^3$ and X$^4$ are hydrogen,
Y is CF$_3$,
Y is a small alkyl group having from 1 to 3 carbon atoms;
Y is CH$_3$—;
Y is C$_2$H$_5$—;
Y is C$_3$H$_7$—;
R$^1$ is a group having 3 to 20 carbon atoms;
R$_1$ is a linear or branched alkyl group having from 1 to 20 carbon atoms;
R$_1$ is a linear alkyl group having from 5 to 10 carbon atoms;
R$_1$ is a branched alkyl group having from 5 to 10 carbon atoms;
R$_1$ is an ether group having 1 to 3 oxygen atoms;
R$_1$ is a thioether group having 3 to 20 carbon atoms;
R$_1$ is an alkene group having 3 to 20 carbon atoms;
R$_1$ is an alkyne group having 3 to 20 carbon atoms;
R$^1$ is an alkyl group having from 3 to about 10 carbon atoms;
R$^1$ is an alkyl group optionally substituted with one or more fluorines and having from 1 to about 20 carbon atoms;
R$^1$ is an olefin containing one or two cis or trans double bonds;
R$_1$ contains at least one Si atom;
R$_1$ contains a —Si(R')$_2$—(CH$_2$)$_p$—Si(R')$_2$— group where p is 1–6 and R' is a small alkyl group having from 1 to 3 carbon atoms;
R$_1$ contains a —Si(R')$_2$—CH$_2$—Si(R')$_2$' group where R' is a small alkyl group having from 1 to 3 carbon atoms;
R$_1$ contains a —Si(R')$_2$—O— group where R' is a small alkyl group having from 1 to 3 carbon atoms;
R$_1$ contains a —Si(R')$_2$—O—Si(R')$_2$— group where R' is a small alkyl group having from 1 to 3 carbon atoms;

$R_1$ is a partially fluorinated alkyl group having from 1 to 20 carbon atoms;

$R_1$ is a perfluorinated alkyl group having from 1 to 20 carbon atoms; or

R' is a methyl group; or any combination of C ring, $X^{1-3}$, lining group D, $R^F$, $R^1$, R' and Y as above-defined.

In specific embodiments, the compounds of formula 2A include those in which R is $R^F$ and:

$R^F$ is a partially fluorinated tail of the formula: $C_nF_{2n+1}C_mH_{2m}$— where n and m range from 1 to about 10 and $R^1$ is an alkyl group having from 3 to about 10 carbon atoms;

$R^F$ is a partially fluorinated tail group of formula $C_nF_{2n+1}C_mH_{2m}$— where n and m range from 1 to about 10, Y is $CF_3$— and $R^1$ is an alkyl group having from 3 to about 10 carbon atoms;

$R^F$ is a partially fluorinated tail group of formula $C_nF_{2n+1}C_mH_{2m}$— where n and m range from 1 to about 10, Y is $CH_3$— and $R^1$ is an alkyl group having from 3 to about 10 carbon atoms;

$R^F$ is a partially fluorinated tail group of formula $C_nF_{2n+1}C_mH_{2m}$— where n and m range from 1 to about 10, Y is $C_3H_7$— and $R^1$ is an alkyl group having from 3 to about 10 carbon atoms;

$R^F$ is a partially fluorinated tail group of formula $C_nF_{2n+1}C_mH_{2m}$— where n and m range from 1 to about 10, and $R^1$ is a group having the formula:

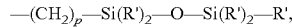

—$(CH_2)_p$—Si(R')$_2$—O—Si(R')$_2$—R', where p is an integer ranging from 2–10 and R' is a small alkyl or perfluoroalkyl group having from 1 to 3 carbon atoms;

$R^F$ is a partially fluorinated tail group of formula $C_nF_{2n+1}C_mH_{2m}$— where n and m range from 1 to about 10, and $R^1$ is a group having the formula:

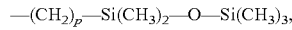

—$(CH_2)_p$—Si(CH$_3$)$_2$—O—Si(CH$_3$)$_3$, where p is an integer ranging from 2–10;

$R^F$ is a partially fluorinated tail of the formula: $C_nF_{2n+1}C_mH_{2m}$— where n and m range from 1 to about 10 and $X^1$ and $X^2$ are fluorines;

$R^F$ is a partially fluorinated tail of the formula: $C_nF_{2n+1}C_mH_{2m}$— where n and m range from 1 to about 10 and $X^3$ and $X^4$ are fluorines;

$R^F$ is a partially fluorinated tail of the formula: $C_nF_{2n+1}C_mH_{2m}$— where n and m range from 1 to about 10 and Ring C is a phenyl ring optionally substituted with one or two fluorines;

$R^F$ is a partially fluorinated alkyl group of the formula $C_4F_9$—$(CH_2)_m$, where m is an integer ranging from 2 to 8;

$R^F$ is a partially fluorinated alkyl group of the formula $C_6F_{13}$—$(CH_2)_m$, where m is an integer ranging from 2 to 8; or $R^F$ is a partially fluorinated alkyl group of the formula $CF_3$—$(CH_2)_m$, where m is an integer ranging from 2 to 10.

In other specific embodiments, the compounds of formula 2A include those having the formula:

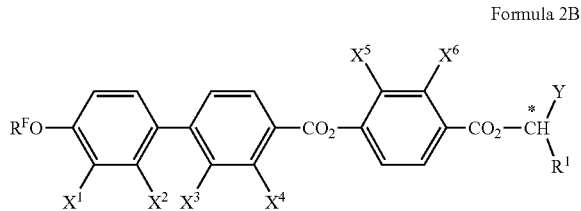

Formula 2B where variables are as defined for formula 1 and 2A and where in more specific embodiments:

$R^F$ is a partially fluorinated alkyl group;

$R^F$ is a partially fluorinated tail of the formula: $C_nF_{2n+1}C_mH_{2m}$— where n and m range from 1 to about 10 and $R^1$ is an alkyl group having from 3 to about 10 carbon atoms;

$X^1$–$X^6$ are fluorines or hydrogens and at least one of $X^1$–$X^6$ is a fluorine and Y is $CF_3$—, $C_2F_5$—, $CH_3$—, $C_2H_5$—, or $C_3H_7$—;

$X^1$ and $X^2$ are fluorines and $X^3$–$X^5$ are hydrogens;

$X^1$–$X^4$ and $X^6$ are hydrogens and $X^5$ is fluorine;

$X^1$, $X^2$ and $X^6$ are hydrogens and $X^3$–$X^5$ are fluorines;

$X^1$, $X^2$ and $X^5$ are fluorines and $X^3$, $X^4$ and $X^6$ are hydrogens;

Y is $CF_3$—;

Y is a small alkyl group having from 1 to 3 carbon atoms;

Y is $CH_3$—;

Y is $C_2H_5$—;

Y is $C_3H_7$—;

$R^1$ is an alkyl or ether group having from 3 to 20 carbon atoms;

$R^F$ is a partially fluorinated alkyl group, Y is $CF_3$— and $X^1$–$X^2$ are fluorines; or $R^F$ is a partially fluorinated alkyl group, Y is $CF_3$—, $X^{1-2}$ are fluorines, $X^{3-5}$ are hydrogens and $R^1$ is an alkyl group.

Preferred compounds of formulas 2A and 2B are chiral nonracemic compounds where * indicates the chiral carbon. Each compound of formulas 2A and 2B has two enantiomers. Chiral nonracemic compound of either enantiomeric form can be employed.

In specific embodiments, the invention further provides compounds of formulas 3A–D:

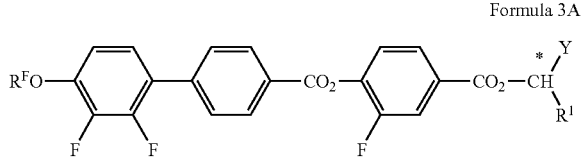

Formula 3A

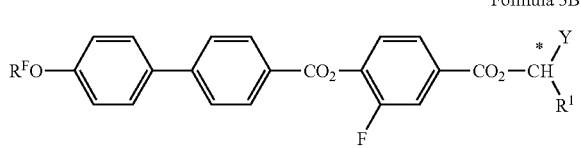

Formula 3B

-continued

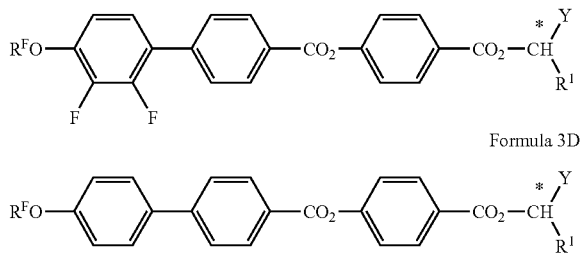

Formula 3C

Formula 3D where variables are as defined above for formulas 1 and 2A–B and in more specific embodiments:

$R^F$ is a partially fluorinated group of formula: $C_nF_{2n+1}C_mH_{2m}$—;
$R^F$ is $CF_3$—$C_mH_{2m}$— where m is 4–10;
$R^F$ is $C_2F_5$—$C_mH_{2m}$— where m is 3–10;
$R^F$ is $C_4F_9$—$C_mH_{2m}$— where m is 1–10;
$R^F$ is $C_6F_{13}$—$C_mH_{2m}$— where m is 1–10;
$Y^F$ is $CF_3$—;
Y is $CH_3$—;
Y is $C_3H_7$—;
$R^1$ is a linear alkyl group having 3 to 7 carbon atoms;
$R^1$ is $C_6H_{13}$—;
$R^1$ is a group having the formula: —$(CH_2)_p$—$Si(R')_2$—O—$Si(R')_2$—R' where p is an integer ranging from 2–10 and R' is a small alkyl group;
$R^1$ is a group having the formula: —$(CH_2)_p$—$si(CH_3)_2$—O—$Si(CH_3)_3$ where p is an integer ranging from 2–10;
$R^1$ is a group having the formula: —$(CH_2)_p$—$Si(CH_3)_2$—O—$Si(CH_3)_3$ where p is 3–6; or
$R^1$ is a group having the formula: —$(CH_2)_5$—$Si(CH_3)_2$—O—$Si(CH_3)_3$.

Preferred compounds of formulas 3A–3D are chiral nonracemic compounds where * indicates the chiral carbon. Each compound of formulas 3A, 3B, 3C and 3D has two enantiomers. Chiral nonracemic compound of either enantiomeric form can be employed.

In the compounds of formulas 2A, 2B, and 3A–D, $R^1$ can be an alkyl group having from 1 to about 20 carbon atoms; $R^1$ can be an alkyl group having from 3 to about 10 carbon atoms; $R^1$ can be an alkyl group optionally substituted with one or more fluorines having from 1 to about 20 carbon atoms; or $R^1$ can be a perfluorinated alkyl group having from 1 to about 20 carbon atoms.

The invention encompasses liquid crystal materials, including FLC materials and including FLC materials exhibiting a smectic C phase, comprising one or more of the compounds of this invention and particularly one or more compounds of formulas 2A, 2B, 3A, 3B, 3C or 3D. Enantiomers and racemates of specifically described compounds are also encompassed by the invention.

LC compositions include those having 5% by weight or more of one or more compounds of this invention (of Formula 1) wherein the added compound or combination of compounds has an effect and preferably a significant effect upon the LC properties of the mixture. LC properties of particular interest include melting temperature, freezing temperature, phase transition temperatures, temperature range of a given phase (e.g., of the smectic C or smectic A phase), and ease of alignment. For purposes of this invention a significant effect on a transition temperature is a change of ±5° C. For purposes of this invention a significant effect on the temperature range of a given phase is a broadening or narrowing of a phase range by ±5° C. Compounds of this invention that are achiral or racemic can be employed as host mixtures for addition of appropriate chiral nonracemic materials (e.g., chiral nonracemic compounds of this invention). In particular, LC compositions of this invention include those having 5% by weight or more of a compound of this invention (of Formula 1) and which exhibit a de Vries smectic A phase.

Preferred mixtures of this invention have 25% by weight or more of one or more chiral nonracemic compounds of this invention (of Formula 1). The mixture optionally contains one or more chiral nonracemic LC compounds, particularly those that enhance polarization of the mixture. The total amount of combined chiral nonracemic components in a mixture is typically 65% or less. Exemplary chiral nonracemic LC additives for mixtures of this invention are illustrated in Schemes 6 and 7. The remaining components (racemic or achiral) of the mixtures form an appropriate host mixture.

Host mixture components are selected in general to achieve desirable phase properties for a given device application. Host components can affect, among other properties, viscosity (and indirectly switching speed), tilt angle, phase transition temperatures and the breadth of phases exhibited by the mixtures. Exemplary components for LC mixtures of this invention are illustrated in Schemes 6 and 7. Preferred components are those such as those exemplified in Scheme 6 and 7 which are compatible with a de Vries smectic A phase (i.e., do not suppress the phase) and which are compatible with V-shaped switching.

Mixtures of this invention include those comprising 50% by weight or more of one or more compounds of this invention (of Formula 1) and those containing 45% or more of one or more compounds of this invention. A preferred subset of mixtures of this invention are those that contain from about 25% to about 50% by weight of more or more components of this invention. Mixtures of this invention also include those that consist essentially of two or more compounds of this invention and particularly those mixtures exhibiting a de Vries smectic A phase.

Mixtures of this invention can include one or more chiral non-racemic compounds of Formula 1 in combination with a host mixture, compatible for mixing with the chiral nonracemic compounds, which comprises two or more achiral or chiral racemic compounds of Formula 1.

The invention also encompasses bistable SSFLC devices and analog switching devices comprising an aligned FLC layer comprising one or more compounds (of Formula 1) of this invention. The invention also encompasses bistable SSFLC devices and analog switching devices comprising an aligned FLC layer comprising one or more compounds of any of Formulas 2A, 2B, 3A, 3B, 3C or 3D.

Scheme 4 lists a number of exemplary chiral nonracemic compounds of this invention and provides exemplary phase diagram data for liquid crystal materials of this invention. Scheme 4 more the most part lists one enantiomers (MDW1228 and MDW 1396 are enantiomers and MDW 1248 and MDW 1397 are enantiomers). Both enantiomers of each chiral nonracemic compound of Scheme 4 are preferred compounds of this invention.

Table 1 provides exemplary data for a liquid crystal material of this invention, specifically for MDW 1248 in combination with a selected host mixture MX8058. The exemplified mixture is a combination of 66% by weight MDW1248 and 34% by weight MX8058. Mixture components of MX8058 are listed in Scheme 5. Scheme 5 also lists two optional components MDW959 and MDW1245 which can be added to produce additional mixtures of this invention. MDW 1245 is a chiral nonracemic component that can be added to enhance the polarization of the mixture. The data in Table 1 illustrates V-shaped switching in the exemplary mixture MX9102. The phase diagram and Ps of the mixture are also given in Table 1.

Most of the compounds in Scheme 4 show broad antiferroelectric phases above room temperature and a typical tri-state switching was observed. V-shaped switching has been found in MDW1228 and 1248 in their smectic phases, which have been confirmed to be smectic C phases. These two compounds can be switched continually in a 2 µm cell using an electric field below ±1V/µm and the switching angle can reach as large as 24°. The voltage dependence of switching angle for MDW 1228 is shown in FIG. 1. Although the V-shaped switching phase range is relatively narrow in these two compounds, their analog electrooptical properties, such as low driving voltage, large switching angle and fast switching time, are much better than deformable helix FLCs, electroclinic and nematic materials.

Figure 2:
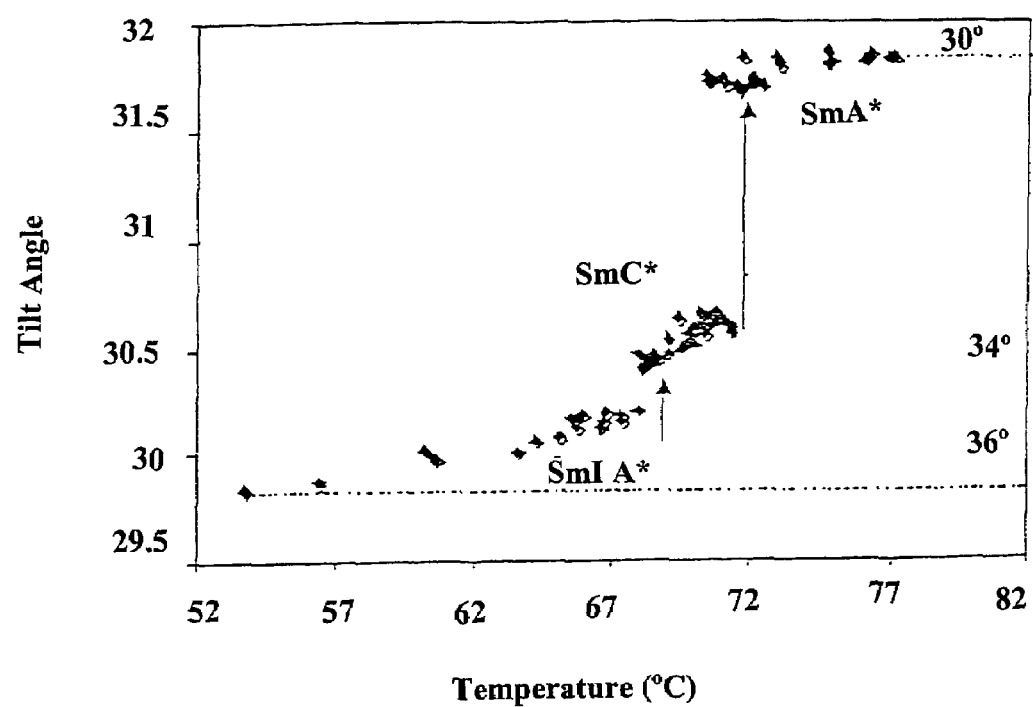
FIG. 2 is a graph of tilt angle as a function of temperature (° C.) showing the layer spacing in MDW1228.

The smectic A phases in both MDW1228 and 1248 have been verified by X-ray diffraction to be de Vries smectic A phases. As shown in FIG. 2, molecules in the smectic A phase (of MDW1228) have a more than 30 degree tilt and the phase transition from smectic A to C shows only a little layer spacing shrinkage.

Both MDW 1228 and MDW 1248 (in appropriate LC mixtures) exhibit V-shaped switching in analog device configurations. Both MDW 1228 and MDW1248 (alone or in appropriate mixtures) form bookshelf geometry in a bistable SSFLC device configuration. Both of these compounds possess a deVries smectic A phase which is believed to be characteristic of LC materials that exhibit the dual behaviors discussed herein.

Each of the compounds in Scheme 4 and enantiomers thereof (in appropriate LC mixtures) exhibit V-shaped switching in analog device configurations. Each of the compounds in Scheme 4 and enantiomers thereof (alone or in appropriate mixtures) form bookshelf geometry in a bistable SSFLC device configuration. These compounds possess a deVries smectic A phase which is believed to be characteristic of LC materials that exhibit the dual behaviors discussed herein.

Table 2A provides data for additional exemplary LC compositions of this invention containing two or more chiral nonracemic compounds of Formula 1. The composition of each mixture is provided in Table 2B and the structures of each component is supplied in Scheme 6. Each of the mixtures of Table 2B exhibits bistable behavior as illustrated by the results (residual tilt angle) of application of a pulsed wave to switch the state of the LC. The magnitude of the residual or memory tilt angle after application of the pulsed voltage is an indication of bistable behavior. A mixture that exhibits a residual tilt angle of 10° is useful as an LC composition for bistable device applications. Those mixtures exhibiting a residual tilt angle of 15° or more are preferred for bistable device applications and those exhibiting a residual tilt angle of 18°. It will be appreciated by those in the art that more preferred LC materials for bistable devices are those exhibiting a residual tilt angle that is or approaches 22.5° which provides for improved contrast in those devices. LC materials that exhibit lower viscosity and higher polarization (Ps) are generally preferred. It is generally the case that addition of chiral nonracemic components that are not compounds of Formula 1, but are compatible with the compounds of Formula 1 and do not adversely affect the bistable properties of the mixture can be added to mixtures of this invention to increase Ps.

Components that are compatible in LC mixtures of this invention in combination with one or more compounds of Formula 1 include LC molecules with partially or fully fluorinated tail groups and those having tail groups that contain silane groups (e.g., achiral or racemic host mixtures containing compounds with such tails). More specifically the components of the mixtures of Table 2A are suitable for and compatible in LC mixtures of this invention containing one or more compounds of Formula 1. For example, LC mixtures of this invention include those that comprise or more chiral nonracemic compounds of Formula 1 (as well as those of Formulas 2A–B and 3A–D) in combination with one or more racemic compounds of Formula 1. In a further example, LC mixtures of this invention include those that comprise one or more chiral nonracemic compounds of Formula 1 (as well as those of Formulas 2A–B and 3A–D) in combination with one or more of the specific components listed in Scheme 6 or in combination with one or more general components listed in Scheme 7 (Compounds of formula 7A–G).

In particular embodiments, mixtures of this invention include those in which one or more chiral nonracemic compounds of Formula 1 are combined with one or more chiral nonracemic compounds of Scheme 6 or 7 (e.g.,one or more compounds of formulas 7A, 7B, 7C, 7D, enantiomers thereof and mixtures of compounds of formulas 7A–D and any of their enantiomers) and in further combination with one or more achiral or racemic compounds of Formula 1 or of those compounds listed in Schemes 6 and 7 (e.g., one or more compounds of formulas 7E, 7F, 7G, 7H, 7I, 7J and mixtures thereof). LC mixtures of this invention include those containing one or more components of Formula 1 and one or more components of the formulas listed in Schemes 6 or 7 and which exhibit V-shaped switching in analog device configurations and bistable behavior in SSFLC devices.

In more specific embodiments, mixture of this invention include those which comprise:

about 5% to about 65% by weight of chiral nonracemic components selected from chiral nonracemic compounds of Formula 1 and the chiral nonracemic compounds of Schemes 6 and 7, particularly compounds of Formula 7A–D, enantiomers thereof, and mixtures of these compounds, where at least 5% by weight of the chiral nonracemic component of the mixture is one or more chiral nonracemic compounds of Formula 1;

about 35% to about 95% by weight of achiral or racemic compounds of Formula 1, achiral or racemic compounds of Scheme 6 and 7, particularly compounds of Formulas 7E–J and mixtures of these compounds.

Mixtures of this invention also include those which comprise:

(1) about 5% to about 40% by weight of one or more chiral nonracemic compounds of Formula 1;

0% to about 25% by weight of one or more chiral nonracemic compounds of Formulas 7A–D; and a total of about 35% to about 95% of achiral or racemic compounds comprising:

0 to about 15% by weight of one or more compounds of Formula 7F;

0 to about 35% by weight of one or more compounds of Formula 7G; and about 50% to about 100% by weight of one or more compounds of Formulas 7E, one or more achiral or racemic compounds of Formula 1 or mixtures thereof;

(2) about 5% to about 40% by weight of one or more chiral nonracemic compounds of Formula 1;
 0% to about 25% by weight of one or more chiral nonracemic compounds of Formulas 7A–D; and
 a total of about 35% to about 95% of one or more achiral or racemic compounds of Formula 1;

(3) about 5% to about 40% by weight of one or more chiral nonracemic compounds of Formula 1;
 0% to about 25% by weight of one or more chiral nonracemic compounds of Formulas 7A–D; and
 a total of about 35% to about 95% of one or more compounds of Formulas 7E–7J;

(4) about 5% to about 40% by weight of one or more chiral nonracemic compounds of Formula 1;
 about 5% to about 25% by weight of one or more chiral nonracemic compounds of Formulas 7A–D;
 about 5% to about 15% by weight of one or more compounds of Formula 7F; about 5% to about 35% by weight of one or more compounds of Formula 7G; and
 0% to about 80% by weight of one or more compounds of Formulas 7E;

(5) about 5% to about 30% by weight of one or more chiral nonracemic compounds of Formula 1;
 about 5% to about 20% by weight of one or more chiral nonracemic compounds of Formulas 7A–D; and
 a total of about 50% to about 90% of achiral or racemic compounds comprising:
  0 to about 15% by weight of one or more compounds of Formula 7F;
  0 to about 35% by weight of one or more compounds of Formula 7G;
  0 to about 25% by weight of one or more compounds of Formula 7H;
  0 to about 25% by weight of one or more compounds of Formulas 7I or 7J and
  about 0 to about 100% by weight of one or more compounds of Formulas 7E, one or more achiral or racemic compounds of Formula 1 or mixtures thereof, (6) about 5% to about 40% by weight of one or more chiral nonracemic compounds of Formula 1;
 about 5% to about 15% by weight of one or more chiral nonracemic compounds of Formulas 7A–D; and
 a total of about 45% to about 90% of achiral or racemic compounds comprising:
  0 to about 15% by weight of one or more compounds of Formula 7E;
  0 to about 35% by weight of one or more compounds of Formula 7F; and
  about 50% to about 100% by weight of one or more compounds of Formulas 7D, one or more achiral or racemic compounds of Formula 1 or mixtures thereof, (7) about 5% to about 40% by weight of one or more chiral nonracemic compounds of Formula 1;
 about 5% to about 15% by weight of one or more chiral nonracemic compounds of Formulas 7A–C; and
 a total of about 45% to about 90% of achiral or racemic compounds of Formulas 7D–7F;

(8) about 15% to about 40% by weight of one or more chiral nonracemic compounds of Formula 1;
 about 10% to about 25% by weight of one or more chiral nonracemic compounds of Formulas 7A–C; and
 a total of about 45% to about 75% by weight of one or more achiral or racemic compounds of Formulas 7D–7F;

(9) about 40% to about 50% by weight of one or more chiral nonracemic compounds of Formula 1;
 about 15% to about 25% by weight of one or more achiral or racemic compounds of Formula 7D; and
 about 25% to about 45% by weight of one or more achiral or racemic compounds of Formula 7F;

(10) about 30% to about 45% by weight of one or more chiral nonracemic compounds of Formula 1;
 about 5% to about 15% by weight of one or more chiral nonracemic compound of Formulas 7A and/or 7B;
 about 25% to about 45% by weight of one or more achiral or racemic compounds of Formula 7F; and
 about 10% to about 40% by weight of one or more achiral or racemic compounds of Formula 7D;

(11) about 20% to about 30% by weight of one or more chiral nonracemic compounds of Formula 1;
 about 5% to about 15% by weight of one or more chiral nonracemic compounds of Formulas 7a and/or 7B;
 about 25% to about 45% by weight of one or more achiral or racemic compounds of Formula 7E; and
 about 10% to about 50% by weight of one or more achiral or racemic compounds of Formula 7D;

(12) any of mixtures 1–11 above which also contain 0 to about 25% by weight of a compound of Formula 7G;

(13) about 5% to about 40% by weight of one or more chiral nonracemic compounds of Formula 1;
 0% to about 25% by weight of one or more chiral nonracemic compounds of Formulas 7A–C; and
 a total of about 35% to about 95% of achiral or racemic compounds comprising:
  0 to about 15% by weight of one or more compounds of Formula 7E;
  0 to about 35% by weight of one or more compounds of Formula 7F;
  0 to about 25% by weight of one or more compounds of Formula 7G and
  about 25% to about 100% by weight of one or more compounds of Formulas 7D, one or more achiral or racemic compounds of Formula 1 or mixtures thereof;

(14) about 5% to about 40% by weight of one or more chiral nonracemic compounds of Formula 1;
 0 to about 25% by weight of one or more chiral nonracemic compounds of Formulas 7A–D; and
 a total of about 35% to about 95% of one or more compounds of Formulas 7E–J; and

(15) about 5% to about 65% by weight of one or more chiral nonracemic compounds of Formula 1;
 0 to about 25% by weight of one or more chiral nonracemic compounds of Formulas 7A–D;
 0 to about 25% by weight of one or more chiral nonracemic compounds of Formulas 7A–D;
 0 to 25% by weight of one or more compounds of Formulas 7I or 7J; and
 about 35% to about 95% by weight of one or more compounds of Formula 7E.

Mixtures of this invention also include those comprising at least one compound of Formula 1 present in the mixture in an amount of at least 10% by weight in combination with 5% by weight or more of at least one compound of Formula 7A–7C and with 5% by weight or more of at least one compound of Formulas 7D–7G. Mixtures of this invention also include those comprising at least one compound of Formula 1 present in the mixture in an amount of at least 25% by weight in combination with 5% by weight or more of at least one compound of Formula 7A–7C and with 5% by weight or more of at least one compound of Formulas 7D–7G. Mixtures of this invention also include those comprising at least two compounds of Formula 1 present in the mixture in an amount of at least 25% by weight in combination with 5% by weight or more of at least one compound of Formula 7A–7D and with 5% by weight or more of at least one compound of Formulas 7E–7J.

Mixtures of this invention include those that comprise two or more or three or more chiral nonracemic compounds of Formula 1. Mixtures of this invention further include those that comprises two or more or three or more compounds of Formula 1 in combination with one or more chiral nonracemic compounds of Formulas 7A, 7B or 7C. it will be appreciated by those of ordinary skill in the art that each of the compounds of Formulas 1, and 7A–C has two enantiomers. It will also be appreciated that the enantiomer of a pair of enantiomers of a given components selected for combination with other enantiomers in a mixture should preferably be selected to achieve the highest polarization (Ps) to provide the fastest switching speed. In the mixtures exemplified in Table 2B, the enantiomers MDW1396 and MDW1397 are combined with each other or with MDW 1498 (all compounds of Formula 1). Mixture with similar properties are obtained by mixing the enantiomers of these compounds, i.e., by mixing MDW 1228, MDW 1248 and the enantiomer of MDW 1498 (MDW 1498E, see Scheme 4). In other mixtures exemplified in Table 2B, the enantiomers MDW1396 and MDW1397 are optionally combined with the enantiomers MDW 1290 and/or MDW 987 and/or MTLC0312. Mixtures with similar properties are obtained by mixing the MDW 1228 and/or MDW 1248 and/or MDW1498E with the enantiomers of MDW 1290 (MDW1290E) and/or the enantiomer of MDW 987 (MDW987E) and/or the enantiomer of MTLC0312 (0312E), see Scheme 6.

Synthesis of the compounds of this invention is illustrated in the following examples and in Schemes 8–10. One of ordinary skill in the art can, in view of the disclosures herein and what is well known in the art, readily synthesize the compounds of this invention from commercially available starting materials or from materials that are otherwise readily available in the art. Optically active 1,1,1-trifluoro-2-alkanols, for example, are described in Jpn. Kokai Tokkyo Roho JP 2000 189,197 Chem Abstracts 133:72991m.

All references cited herein are incorporated by reference herein to the extent that they are not inconsistent with the description herein.

THE EXAMPLES

Example 1

Synthesis of MDW1228 and 1248

The following descriptions refer to compounds illustrated in Schemes 8 and 9.

7,7,8,8,9,9,10,10,10-Nonafluoro-5-iodo-decanol (2, n is 3)

To the mixture of 5 g of 5-hexenol and 17.4 g of perfluoro iodobutane, was added 110 mg of AIBN (azobis(isobutyronitrile) at RT under $N_2$ atmosphere. After 15 min another 110 mg of AIBN was added. The resulting solution was then refluxed at 70° C. for 4 hrs. The reaction mixture was cooled down and used for the next reaction without further purification.

7,7,8,8,9,9,10,10-Nonafluoro-decanol(3, n is 3)

To a solution of 2 g of LAH (lithium aluminum hydride) in 120 ml of ether (abs.), was added slowly ca. 22 g of iodo derivative (2) in 30 ml ether (abs.). After addition, the reaction mixture was stirred at RT for two days and then cooled down to 5° C. in ice water. Water was added slowly to the reaction mixture until no gas evolved. Solid was filtered through a short column of silica gel, washed with ether, ethyl acetate. The filtrates were combined and the solvent was evaporated. The residue was distilled under vacuum to give 13 g (81% yield) of the partial-fluoro alcohol (3, n is 3).

7,7,8,8,9,9,10,10,10-Nonafluoro-decyl tosylate(4, n is 3)

The solution of 9.8 g of partial- fluoro alcohol (3) in 40 ml of pyridine was cooled down to 0° C. in ice-salt water and 6 g of TsCl (tosyl chloride) was added in small portion. After addition the resulting mixture was stirred at 0C for two hours and then placed in freezer (−20° C.) for two days. The reaction mixture was poured into ice water and the product was extracted with ethyl acetate twice, brine, 10% HCl and again brine three times. The organic solution was dried over $MgSO_4$ and evaporated to give pure partial-fluoro tosylate (4, n is 3, yield 98%).

This same procedure is used to synthesize 5, 5, 6, 6, 7, 7, 8, 8, -Nonafluoro-octyl tosylate (4, n is 1).

The following synthesis is general for synthesis of both MDW1228 and 1248. The synthesis of MDW1228 employs tosylate 4, where n is 1. The synthesis of MDW1248 employs tosylate 4 where n is 3.

1,2-difluoro-3-partialfluoroalkoxybenzene (5)

2 mmol of partialfluoroalkyl tosylate (4), 2 mmol of 2,3-difluorophenol (19), 2 mmol of $Cs_2CO_3$ and 20 ml of DMF (N,N-dimethylformamide) were combined and stirred at RT overnight. Then the reaction mixture was poured into water and the product was collected by extraction. The organic solution was washed with brine and dried over $MgSO_4$. After evaporation of solvent, pure product was obtained in yield of 100%.

2,3-difluoro-4-partialfluoroalkoxyphenyl boronic acid (6)

To a dry flask containing 37 mmol of 1,2-difluoro-4-alkoxybenzene (5) and 80 ml of THF (tetrahydrofuran), cooled to −78° C., 21 ml of ButylLi (2.2M in Hexane) was added slowly. After addition the reaction mixture was stirred at −70° C. for 1 h and then 17.6 ml of triisopropylborate was added slowly. The reaction solution was allowed to warm up to RT and stirred at RT overnight. Then 70 ml of water was added slowly and stirred at RT for two hours. The product was collected by extraction with hexane. The extract was washed with brine and dried over $MgSO_4$. After evaporation of solvent, the residue was purified by short column chromatography to give pure product in yield of 92%.

Ethyl 4-(2,3-difluoro-4-partialfluoroalkoxyphenyl) benzoate (8)

To the solution of 0.6 g of ethyl 4-bromobenzoate (7) in 7.5 ml of toluene, was added 4 ml of $Na_2CO_3$ (2M aqueous solution), followed by 2.6 mmol 2,3-difluoro-4-partialfluoroalkoxyphenyl boronic acid (7) in 2 ml of methanol and 50 mg of $Pd(PPh_3)_4$ (tetrakis(triphenylphoshine)palladium). The resulting mixture was heated up to 80° C. and stirred at this temperature vigorously for 48 hrs. It was then cooled down and partitioned between 15 ml methylene chloride and 12 ml of 2M aqueous Na$_2$CO$_3$. The organic phase was separated, washed with brine and dried over MgSO$_4$. After evaporation of solvent, the residue was purified by flash chromatography. The yield is 86%.

4-(2,3-difluoro4-partialfluoroalkoxyphenyl) benzoic acid (9)

To a solution of 0.4 g KOH in 20 ml MeOH, was added 1 mmol of ethyl 4-(2,3-difluoro-4-partialfluoroalkoxyphenyl) benzoate(8). After the resulting mixture was refluxed for 4 hrs, the excess methanol was removed. The residue was mixed with 30 ml water and extracted with ether twice. The water solution was acidified with conc. HCl and extracted with ethyl acetate. The ethyl acetate solution was washed with brine and dried. After evaporation of solvent, pure product was obtained in yield of 100%.

Ethyl 4-benzyloxybenzoate (11)

35 mmol of benzyl bromide (BzBn, 35 mmol of ethyl 4-hydroxybenzoate (10), 14 g of Cs$_2$CO$_3$ and 40 ml of DMF were combined and stirred at RT ove night. Then the reaction mixture was poured into water and the product was collected by extraction. The organic solution was washed with brine and dried over MgSO$_4$. After evaporation of solvent, pure product was obtained in yield of 100%.

4-Benzyloxybenzoic acid (12)

To the solution of 0.5 g KOH in 40 ml MeOH, was added 6.5 mmol of ethyl 4-benzyloxybenzoate. After the resulting mixture was refluxed for 4 hrs, the excess methanol was removed. The residue was mixed with 30 ml water and extracted with ether twice. The water solution was acidified with conc. HCl and extracted with ethyl acetate. The ethyl acetate solution was washed with brine and dried. After evaporation of solvent, pure product was obtained in quantitative yield.

[R]-1-Trifluoromethylheptyl 4-Benzyloxybenzoate (13)

To the solution of 7 mmol of 4-benzloxybenzoic acid 12 in 5 ml of SOCl$_2$, one drop of DMF was added. The resulting mixture was stirred at refluxing for two hour. The excess of SOCl$_2$ was removed and 20 ml of pyridine was added, followed by 1.2 g of [R]-1-trifluoromethyl heptanol. The resulting mixture was stirred at RT over night and then poured into ice-cold diluted HCl solution. The product was collected by extraction hexane. The organic phase was washed with diluted HCl, water, NaHCO$_3$ solution and brine. After dried over MgSO$_4$ the solvent was removed and the residue was purified by flash chromatography to give pure product in yield of 80%.

[R]-1-Trifluoromethylheptyl 4-hydroxybenzoate (14)

2.2 g of [R]-1-trifluoromethylheptyl 4-benzyloxybenzoate, (13) 100 mg of PdOH/C in 50 ml of ethyl acetate was stirred at RT over night under H$_2$ atmosphere. Then the catalyst was filtered out and filtrate was evaporated to dryness to give the pure compound in yield of 99%.

[R]-1-Trifluoromethylheptyl4-(4-(2,3-difluoro-4-partialfluoroalkoxyphenyl) phenyl carbonyloxy)) benzoate (15)

0.4 mmol of 4-(2,3-difluoro-4-partialfluoroalkoxyphenyl) benzoic acid (14), 0.4 mmol of [R]-1-trifluoromethylheptyl 4-hydroxybenzoate, 200 mg of DCC, (1,3-dicyclohexylcarbodiimide) 15 mg of DMAP (4-dimethylaminopyridine) and 20ml of methylene chloride were combined and stirred at RT over night. The solid was filtered out and the filtrate was concentrated. The residue was purified by flash chromatography to give pure product with yield over 80%. Compound 15 where n is 1 is MDW 1228 and compound 15 where n is 3 is MDW 1248.

Example 2

Synthesis of MDW-1250 and 1449

In the following description of the preparation of MDW1250 compound numbers refer to Scheme10:

2',3'-Difluoro -4'-(4-pentyloxybutoxy)-biphenyl4 -carboxylic acid 4 -[(R)1-trifluoromethylheptyloxycarbonyl]-phenyl ester (28)

2-(4-Bromobutoxy)tetrahydropyran (18):

To a solution of commercially available 4-bromobutan-1-ol (16) (1 equi.) and 3,4-dihydropyran (17) (1.5 equi.) in dichloromethane (3 mL/mmole), phosphorus oxychloride (0.01 equi.) was added at room temperature. The reaction mixture was stirred at that temperature for 24 h. Then potassium carbonate (1 equi.) was added to the reaction mixture and the reaction mixture was stirred at room temperature for 1 h, quenched with water, extracted with dichloromethane, washed with brine, dried over MgSO$_4$, and concentrated in vacuo. Purification by chromatography on silica gel (5% EtOAc (ethylacetate)/hexanes) afforded 2-(4-bromobutoxy) -tetrahydropyran (18), as a colorless oil (88%).

2-[4-(2,3-Difluorophenoxy)butoxy]-tetrahydropyran (20):

To a solution of 2-(4-bromobutoxy)-tetrahydropyran (18) (1 equi.) and commercially available 2,3-difluorophenol (19) (1 equi.) in DMF (3 mL/mmole), cesium carbonate (1.25 equi.) was added at room temperature. The reaction mixture was stirred at that temperature for 24 h, quenched with water, extracted with ethyl acetate:hexane (1:1), washed with brine, dried over MgSO$_4$, and concentrated in vacuo. Purification by chromatography on silica gel (5% EtOAc/hexanes) and recrystallization from acetonitrile gave 2-[4-(2,3-difluorophenoxy)-butoxy]-tetrahydropyran(20), as a white solid (84%).

4-(2,3-Difluorophenoxy)-butan-1-ol (22):

To a solution of 2-[4-(2,3-difluorophenoxy)-butoxy]-tetrahydropyran (20) (1 equi.) and commercially available para-toluenesulfonic acid (21) (0.1 equi.) in methanol:THF (1:1) (3 mL/mmole), water (0.005 equi.) was added at room temperature. The reaction mixture was stirred at that temperature for 24 h, quenched with water, extracted with ethyl acetate:hexane (1:1), washed with brine, dried over MgSO$_4$, and concentrated in vacuo. Purification by chromatography on silica gel (10% EtOAc/hexanes) gave 4-(2,3-difluorophenoxy)-butan 1-ol (22), as a white solid (84%)

1,2-Difluoro-3-(4-pentyloxybutoxy)benzene (24):

Sodium hydride (1 equi.) was added to the solution of 4-(2,3-difluorophenoxy)-butan-1-ol (22), (1 equi.) and 1-bromopentane (1 equi.) in DMF (1 mL/mmole) and the reaction mixture was stirred at room temperature for 12 h,. quenched with water, extracted with ethyl acetate:hexane (1:1), washed with brine, dried over MgSO$_4$, and concentrated in vacuo. Purification by chromatography on silica gel (5% EtOAc/hexanes) and recrystallization from acetonitrile gave 1,2-difluoro-3-(4-pentyloxybutoxy)-benzene (24), as a white solid (84%).

2,3-Difluoro-4-(4-pentyloxybutoxy)phenylboronic acid (25):

To a solution of 1,2-difluoro-3-(4-pentyloxybutoxy)-benzene (24), (1 equi.) in THF (5 mL/mmole), butyllithium (1.3 equi.) was added at −78° C. The reaction mixture was stirred at that temperature for 2 h,. Then triisopropylborate (1 equi.) was added at that temperature. The reaction mixture was stirred at that temperature for 1 h and at room temperature for 10 h, quenched with water, extracted with ethyl acetate, washed with brine, dried over MgSO$_4$, and concentrated in vacuo. Purification by recrystallization from hexane gave 2,3-difluoro-4-(4-pentyloxybutoxy)phenylboronic acid (25), as a white solid (75%).

2',3'-Difluoro-4'-(4-pentyloxybutoxy)-biphenyl-4-carboxylic acid ethyl ester 26):

A biphasic solution of 2,3-difluoro-4-(4-pentyloxybutoxy)phenylboronic acid (25): (1 equi.), 4-bromo-benzoic acid ethyl ester (12), (1 equi.), sodium carbonate (2.7 equi.), and Pd(PPh$_3$)$_4$ catalyst (0.01 equi.) in water-toluene (1:1) (2 mL/mmole) was stirred at 100 C. temperature for 12 h., cooled to room temperature, extracted with ethyl acetate:hexane(1:1), washed with brine, dried over MgSO4, and concentrated in vacuo. The purification by chromatography on silica gel (5% EtOAc/hexanes) and recrystallization from acetonitrile afforded 2',3'-difluoro-4'-(4-pentyloxybutoxy)-biphenyl-4-carboxylic acid ethyl ester (26) as a white solid (88%).

4'-(4-Butoxybutoxy)-2',3'-difluorobiphenyl-4-carboxylic acid (27):

A solution of 2',3'-difluoro-4'-(4-pentyloxybutoxy)-biphenyl-4-carboxylic acid ethyl ester(26) (1 equi.) and potassium hydroxide (3.5 equi.) in water-ethanol (1:1) (25 mL/mmole) was stirred at 80° C. for 2 h., cooled to room temperature, quenched with hydrochloric acid (5%). The resulting white solid was filtered, washed with water, and dried under vacuum to give 4'-(4-butoxybutoxy)-2',3'-difluorobiphenyl-4-carboxylic acid (27) as a white solid (80%).

2',3'-Difluoro-4'-(4-pentyloxybutoxy)-biphenyl-4-carboxylic acid 4-[(R)-1-trifluoromethylheptyloxycarbonyl]-phenyl ester (28):

To a solution of 4'-(4-butoxybutoxy)-2',3'-difluorobiphenyl-4-carboxylic acid (27) (1 equi.), (4-hydroxybenzoic acid (R)-1-trifluoromethyl-heptyl ester (7) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 2',3'-difluoro-4'-(4-pentyloxybutoxy)-biphenyl-4-carboxylic acid 4-[(R)-1-trifluoromethylheptyl oxycarbonyl]-phenyl ester (28) as a white solid (65%).

Preparation of MDW-1497:

Synthesis of 2',3'-difluoro-4'-(6,6,7,7,8,8,9,9,9-nonafluoro-nonyl)-biphenyl-4-carboxylic acid 4-[(R)-1-methyl-6-(1,1,3,3,3-pentamethyl-disiloxanyl)-hexyloxycarbonyl]-phenyl ester (36) where all numbers refer to Scheme 9.

(R)-Hept-6-en-2-ol (31):

To a solution of (R)-2-methyloxirane (29) (1 equi), and copper (I) bromide (0.05 equi.) in THF (2 mL/mmole), a solution of but-4-enylmagnesium bromide (30), (0.5M in THF) (1.1 equi.) was added at ice temperature over a period of 20 min. The reaction mixture was stirred at room temperature for 24 h, quenched with 5% aqueous ammonium chloride (1 mL/mmole), extracted with hexane, washed with brine, dried over MgSO4, and concentrated in vacuo. Purification by chromatography on silica gel (hexane) gave (R)-hept-6-en-2-ol (31) a colorless oil (96%).

4-Benzyloxybenzoic acid (R)-1-methyl-hex-5-enyl ester (32):

To a solution of 4-benzyloxy-benzoic acid (4) (1 equi.), (R)- hept-6-en-2-ol (31) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 4-benzyloxybenzoic acid (R)-1-methyl-hex-5-enyl ester (32) as a colorless oil (65%).

4-Benzyloxy-benzoic acid (R)-1-methyl-6-(1,1,3,3,3-pentamethyl-disiloxanyl)hexyl ester (34):

Nitrogen gas was bubbled through the solution of 4-benzyloxybenzoic acid (r)-1-methyl-hex-5-enyl ester (32) (1 equi.) And 1,1,1,3,3-pentamethyldisiloxane (33) (1.2 equi.) In toluene (10 ml/mmole) for 15 min. Pt catalyst (0.001 equi.) Was added to the reaction mixture and nitrogen bubbling was continued for another 15 min. The reaction mixture was stirred at 55 c for 24 h, cooled to room temperature, quenched with water, extracted with ethyl acetate:hexane (1:1), washed with brine, dried over MgSO$_4$, and concentrated in vacuo. Purification by chromatography on silica gel (5% EtOAc/hexanes) afforded 4-benzyloxybenzoic acid (R)-1-methyl-6-(1,1,3,3,3-pentamethyl-disiloxanyl) hexyl ester (34) a white solid (96%).

4-Hydroxy-benzoic acid (R)1-methyl-6-(1,1,3,3,3-pentamethyl-disiloxanyl)hexyl ester (35):

A solution of 4-benzyloxy-benzoic acid (Rs 1-methyl-6-(1,1,3,3,3-pentamethyl-disiloxanyl)-hexyl ester (34) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd—C catalyst, concentrated in vacuo and recrystallized from acetonitrile-ethanol (3:1) to give 4-hydroxybenzoic acid (R)-1-methyl-6-(1,1,3,3,3-pentamethyl-disiloxanyl) hexyl ester (35) as a colorless oil (84%).

2',3'-Difluoro-4'-(6,6,7,7,8,8,9,9,9-nonafluoro-nonyl)-biphenyl-4-carboxylic acid 4-[(R)-1-methyl-6-(1,1,3,3,3-pentamethyl-disiloxanyl)hexyloxycarbonyl]-phenyl ester (36):

To a solution of 2',3'-difluoro-4'-(5,5,6,6,7,7,8,8,8-nonafluorooctyloxy)-biphenyl-4-carboxylic acid (9, n is 1) (1 equi.), 4-hydroxy-benzoic acid (R)-1-methyl-6-(1,1,3,3,3-pentamethyl-disiloxanyl)-hexyl ester (35) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) gave 2',3'-difluoro-4'-(6,6,7,7,8,8,9,9,9-nonafluoro-nonyl)-biphenyl-4-carboxylic acid 4-[(R)-1-methyl-6-(1,1,3,3,3-pentamethyldisiloxanyl)-hexyloxycarbonyl]-phenyl ester (36) as a white solid (65%).

Example 2

Synthesis of MDW-1250 and 1449

Preparation of MDW-1250:

Synthesis of 2',3'-Difluoro-4'-(4-pentyloxybutoxy)-biphenyl-4-carboxylic acid 4-[(R)-1-trifluoromethylheptyloxycarbonyl]-phenyl ester (28), where compound numbers refer to Scheme 10:

2-(4-Bromobutoxy)-tetrahydropyran (18):

To a solution of commercially available 4-bromobutan-1-ol (16) (1 equi.) and 3,4-dihydropyran (17) (1.5 equi.) in dichloromethane (3 mL/mmole), phosphorus oxychloride (0.01 equi.) was added at room temperature. The reaction mixture was stirred at that temperature for 24 h. Then potassium carbonate (1 equi.) was added to the reaction mixture and the reaction mixture was stirred at room temperature for 1 h, quenched with water, extracted with dichloromethane, washed with brine, dried over MgSO4, and concentrated in vacuo. Purification by chromatography on silica gel (5% EtOAc/hexanes) afforded 2-(4-bromobutoxy)-tetrahydropyran (18), as a colorless oil (88%).

2-[4-(2,3-Difluorophenoxy)-butoxy]-tetrahydropyran (20):

To a solution of 2-(4-bromobutoxy)-tetrahydropyran (18) (1 equi.) and commercially available 2,3-difluorophenol (19) (1 equi.) in DMF (3 mL/mmole), cesium carbonate (1.25 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) and recrystallization from acetonitrile gave 2-[4-(2,3-difluorophenoxy)-butoxy]-tetrahydropyran(20), as a white solid (84%).

4-(2,3-Difluorophenoxy)-butan-1-ol (22):

To a solution of 2-[4-(2,3-difluorophenoxy)-butoxy]-tetrahydropyran (20) (1 equi.) and commercially available para-toluenesulfonic acid (21) (0.1 equi.) in methanol:THF (1:1) (3 mL/mmole), water (0.005 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (10% EtOAc/hexanes) gave 4-(2,3-difluorophenoxy)-butan-1-ol (22), as a white solid (84%).

1,2-Difluoro-3-(4-pentyloxybutoxy)benzene (24):

Sodium hydride (1 equi.) was added to the solution of 4-(2,3-difluorophenoxy)-butan-1-ol (22), (1 equi.) and 1-bromopentane (1 equi.) in DMF (1 mL/mmole) and the reaction mixture was stirred at room temperature for 12 h,. quenched with water, extracted with ethyl acetate:hexane (1:1), washed with brine, dried over MgSO4, and concentrated in vacuo. Purification by chromatography on silica gel (5% EtOAc/hexanes) and recrystallization from acetonitrile gave 1,2-difluoro-3-(4-pentyloxybutoxy)-benzene (24), as a white solid (84%).

2,3-Difluoro4-(4-pentyloxybutoxy)phenylboronic acid (25):

To a solution of 1,2-difluoro-3-(4-pentyloxybutoxy)-benzene (24), (1 equi.) in THF (5 mL/mmole), butyllithium (1.3 equi.) was added at −78° C. The reaction mixture was stirred at that temperature for 2 hr,. Then triisopropylborate (1 equi.) was added at that temperature. The reaction mixture was stirred at that temperature for 1 h and at room temperature for 10 h, quenched with water, extracted with ethyl acetate, washed with brine, dried over MgSO4, and concentrated in vacuo. Purification by recrystallization from hexane gave 2,3-difluoro-4-(4-pentyloxybutoxy)phenylboronic acid (25), as a white solid (75%).

2',3'-Difluoro-4'-(4-pentyloxybutoxy)-biphenyl-4-carboxylic acid ethyl ester (26):

A biphasic solution of 2,3-difluoro-4-(4-pentyloxybutoxy)phenylboronic acid (25) (1 equi.), 4-bromo-benzoic acid ethyl ester (12), (1 equi.), sodium carbonate (2.7 equi.), and tetrakis(triphenylphoshine)palladium catalyst (0.01 equi.) in water-toluene (1:1) (2 mL/mmole) was stirred at 100 C. temperature for 12 h., cooled to room temperature, extracted with ethyl acetate:hexane(1:1), washed with brine, dried over MgSO4, and concentrated in vacuo. The purification by chromatography on silica gel (5% EtOAc/hexanes) and recrystallization from acetonitrile afforded 2',3'-difluoro-4'-(4-pentyloxybutoxy)-biphenyl-4-carboxylic acid ethyl ester (26) as a white solid (88%).

4'-(4-Butoxybutoxy)-2',3'-difluorobiphenyl-4-carboxylic acid (27):

A solution of 2',3'-difluoro-4'-(4-pentyloxybutoxy)-biphenyl-4-carboxylic acid ethyl ester(26) (1 equi.) and potassium hydroxide (3.5 equi.) in water-ethanol (1:1) (25 mL/mmole) was stirred at 80 C. temperature for 2 h., cooled to room temperature, quenched with hydrochloric acid (5%). The resulting white solid was filtered, washed with water, and dried under vacuum to give 4'-(4-butoxybutoxy)-2',3'-difluorobiphenyl-4-carboxylic acid (27) as a white solid (80%).

2',3'-Difluoro-4'-(4-pentyloxybutoxy)-biphenyl-4-carboxylic acid 4-[(R)-1-trifluoromethylheptyloxycarbonyl]-phenyl ester (28):

To a solution of 4'-(4-butoxybutoxy)-2',3'-difluorobiphenyl-4-carboxylic acid (27) (1 equi.), (4-hydroxybenzoic acid (R)-1-trifluoromethyl-heptyl ester (13, Scheme 7) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 2',3'-difluoro-4'-(4-pentyloxybutoxy)-biphenyl-4-carboxylic acid 4-[(R)-1-trifluoromethylheptyloxycarbonyl]-phenyl ester (28) as a white solid (65%).

Preparation of MDW-1497:

Synthesis of 2',3'-Difluoro-4'-(6,6,7,7,8,8,9,9,9-nonafluoro-nonyl)-biphenyl-4-carboxylic acid 4-[(R)-1-methyl-6-(1,1,3,3,3-pentamethyl-disiloxanyl)-hexyloxycarbonyl]-phenyl ester (36) where all numbers refer to Scheme 11.

(R-Hept-6-en-2-ol (31):

To a solution of (R)-2-methyloxirane (29) (1 equi), and copper (I) bromide (0.05 equi.) in THF (2 mL/mmole), a solution of but-4-enylmagnesium bromide (30), (0.5M in THF) (1.1 equi.) was added at ice temperature over a period of 20 min. The reaction mixture was stirred at room temperature for 24 h, quenched with 5% aqueous ammonium chloride (1 mL/mmole), extracted with hexane, washed with brine, dried over MgSO4, and concentrated in vacuo. Purification by chromatography on silica gel (hexane) gave (R)-hept-6-en-2-ol (31) a colorless oil (96%).

4-Benzyloxybenzoic acid (R)-1-methyl-hex-5-enyl ester (32):

To a solution of 4-benzyloxy-benzoic acid (4) (1 equi.), (R)-hept-6-en-2-ol (31) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 4-benzyloxybenzoic acid (R)-1-methyl-hex-5-enyl ester (32) as a colorless oil (65%).

4-Benzyloxy-benzoic acid (R)-1-methyl-6-(1,1,3,3,3-pentamethyl-disiloxanyl)-hexyl ester (34):

Nitrogen gas was bubbled through the solution of 4-benzyloxybenzoic acid (R)-1-methyl-hex-5-enyl ester (32) (1 equi.) and 1,1,1,3,3-pentamethyldisiloxane (33) (1.2 equi.) in toluene (10 mL/mmole) for 15 min. Pt catalyst (0.001 equi.) was added to the reaction mixture and nitrogen bubbling was continued for another 15 min. The reaction mixture was stirred at 55 C. for 24 h, cooled to room temperature, quenched with water, extracted with ethyl acetate:hexane (1:1), washed with brine, dried over MgSO4, and concentrated in vacuo. Purification by chromatography on silica gel (5% EtOAc/hexanes) afforded 4-benzyloxybenzoic acid (R)-1-methyl-6-(1,1,3,3,3-pentamethyl-disiloxanyl)-hexyl ester (34) a white solid (96%).

4-Hydroxy-benzoic acid (R)-1-methyl-6-(1,1,3,3,3-pentamethyl-disiloxanyl)-hexyl ester (35):

A solution of 4-benzyloxy-benzoic acid (R)-1-methyl-6-(1,1,3,3,3-pentamethyl-disiloxanyl)-hexyl ester (34) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo and recrystallized from acetonitrile-ethanol (3:1) to give 4-hydroxy-benzoic acid (R)-1-methyl-6-(1,1,3,3,3-pentamethyl-disiloxanyl)-hexyl ester (35) as a colorless oil (84%).

2',3'-Difluoro-4'-(6,6,7,7,8,8,9,9,9-nonafluoro-nonyl)-biphenyl-4-carboxylic acid 4-[(R)-1-methyl-6-(1,1,3,3,3-pentamethyl-disiloxanyl)hexyloxycarbonyl]-phenyl ester (36):

To a solution of 2',3'-difluoro-4'-(5,5,6,6,7,7,8,8,8-nonafluoro-octyloxy)-biphenyl-4-carboxylic acid (9, Scheme 7) (1 equi.), 4-hydroxy-benzoic acid (R)-1-methyl-6-(1,1,3,3,3-pentamethyl-disiloxanyl)-hexyl ester (35) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) gave 2',3'-difluoro-4'-(6,6,7,7,8,8,9,9,9-nonafluoro-nonyl)-biphenyl-4-carboxylic acid 4-[(R)-1-methyl-6-(1,1,3,3,3-pentamethyl-disiloxanyl)-hexyloxycarbonyl]-phenyl ester (36) as a white solid (65%).

Those of ordinary skill in the art will appreciate that materials and methods other than those specifically exemplified herein can be employed in the practice of this invention without expense of undue experimentation. All materials and methods known or understood in the art to be functional equivalents of the materials and methods exemplified herein are intended to be encompassed by this invention.

Scheme 1
Exemplary A, B and C rings for the Compounds of Formula I

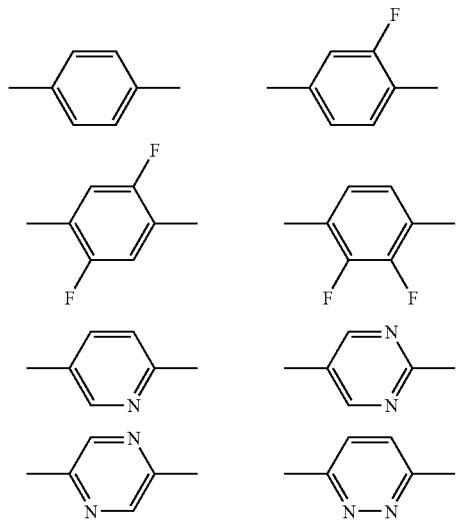

Scheme 2
Exemplary A-B Ring Combinations for the Compounds of Formula I

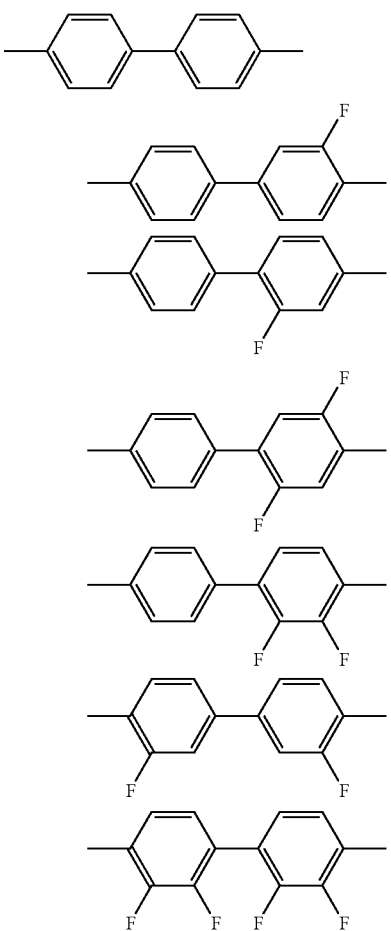

-continued
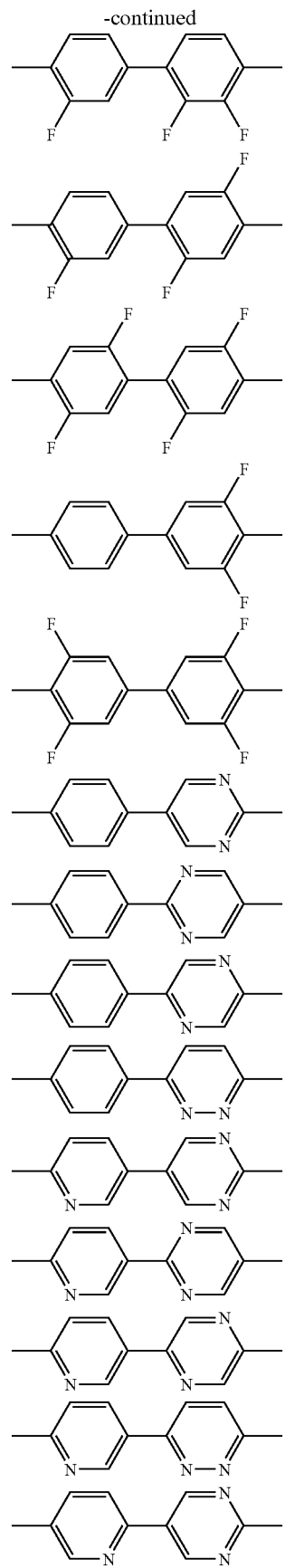
-continued
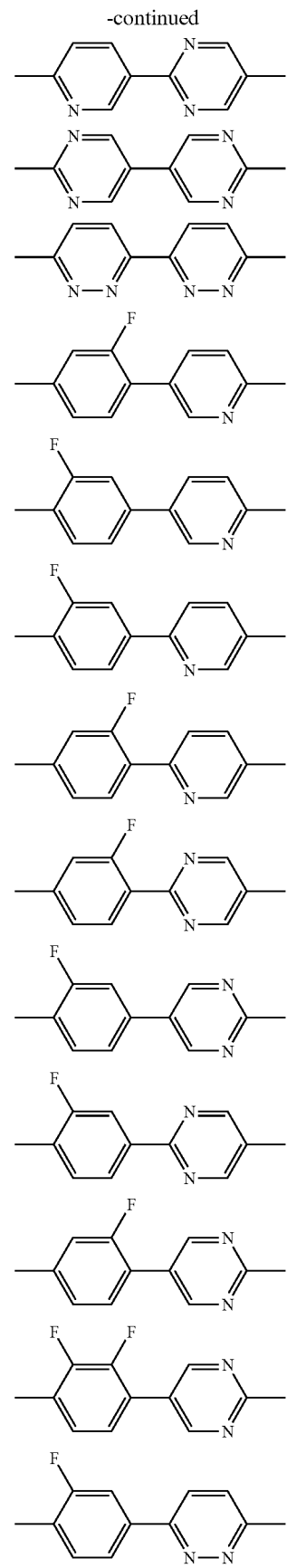

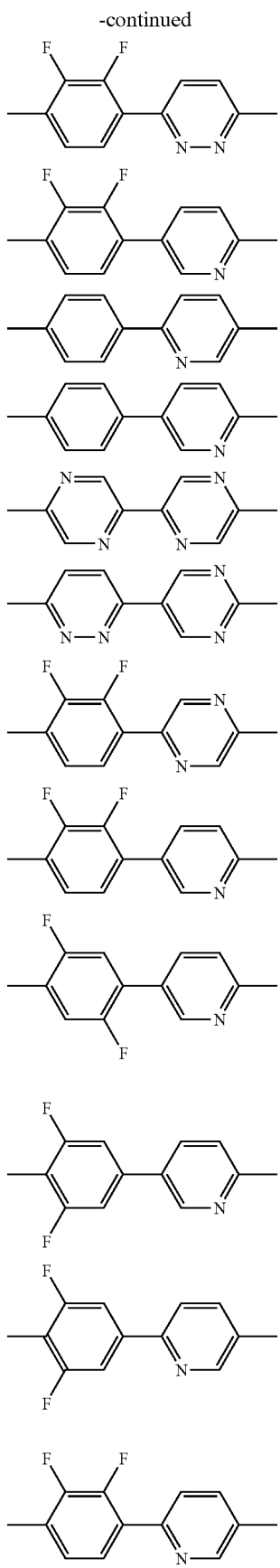
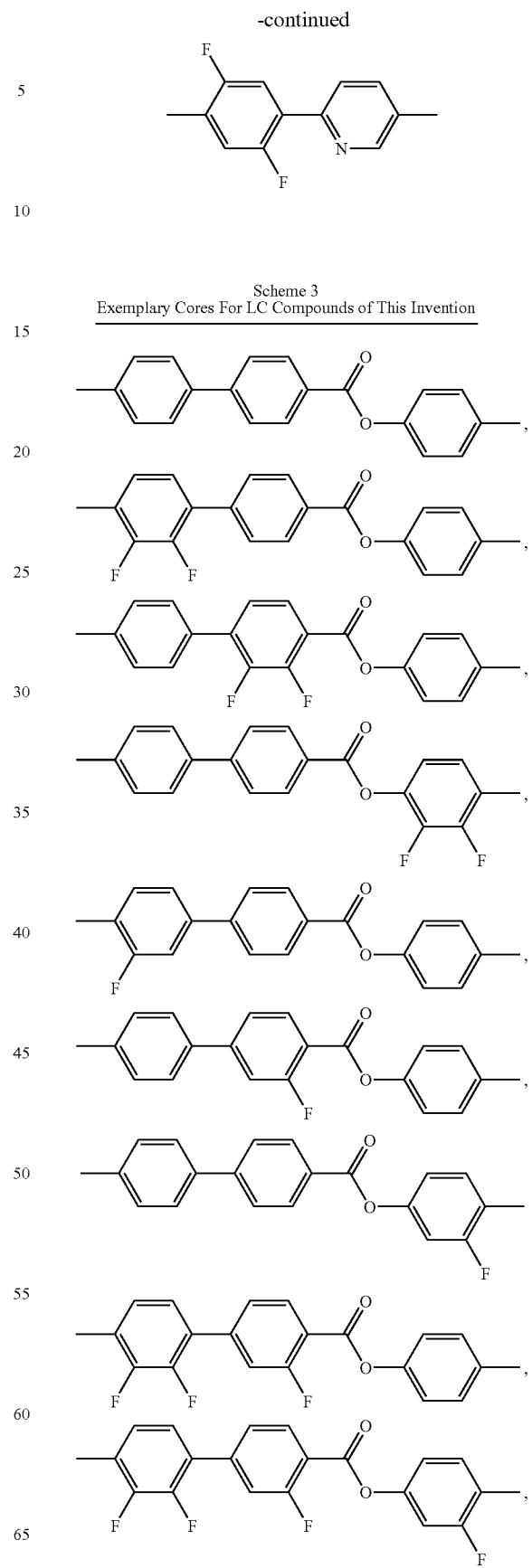
Scheme 3
Exemplary Cores For LC Compounds of This Invention -continued
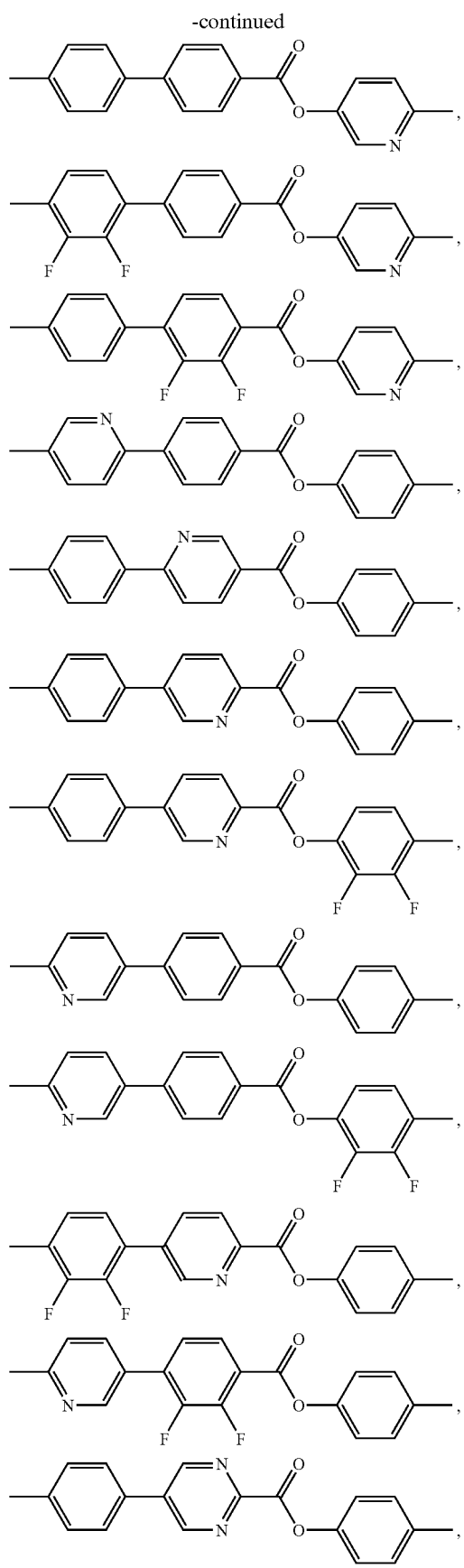
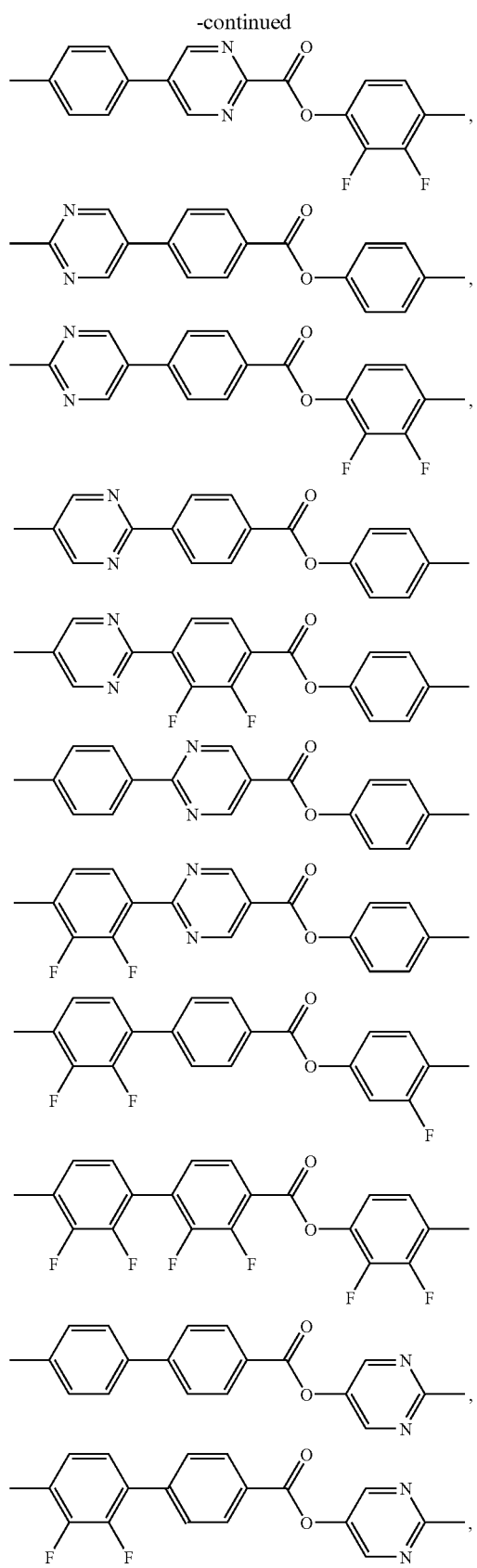
or -continued
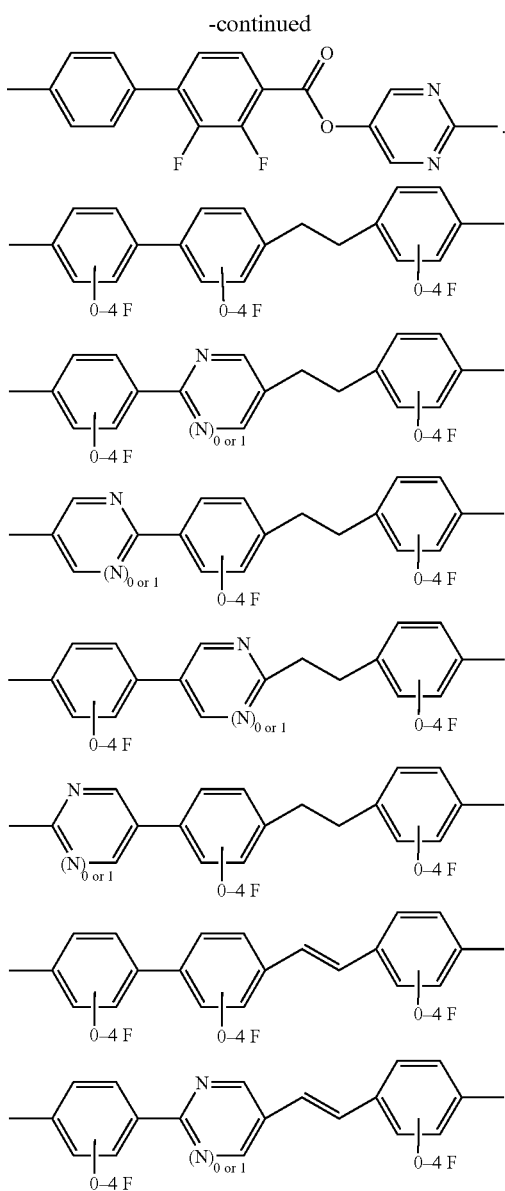
-continued
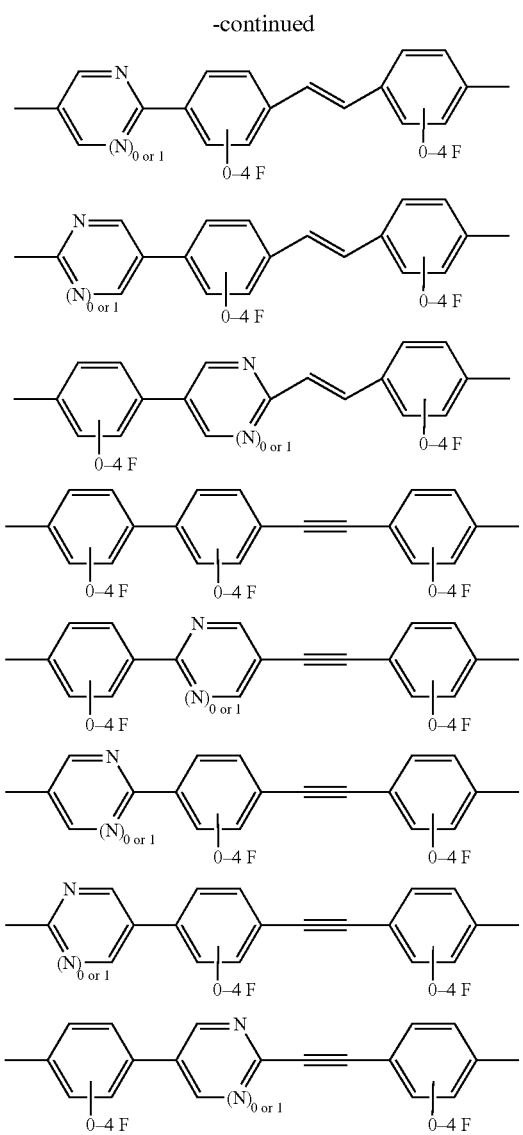
Scheme 4: EXEMPLARY COMPOUNDS OF THIS INVENTION
MDW#  STRUCTURE
1228
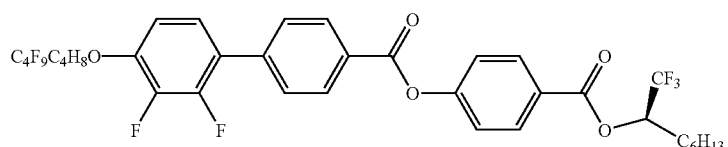
I 77 $S_A$ 71 $S_C$ 68 $S_I$ ? X Scheme 4: EXEMPLARY COMPOUNDS OF THIS INVENTION
MDW# STRUCTURE
1229
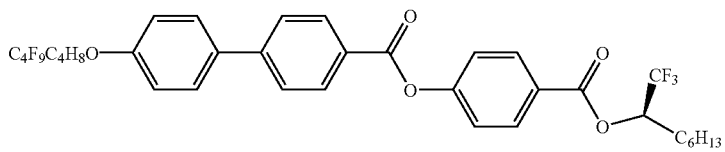
I 110 $S_A$ 102 $S_C$ 99 $S_I$ ? X
1236
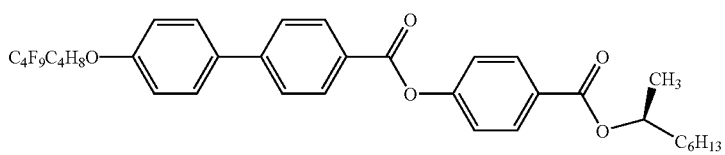
I 134 $S_A$ 119 $S_C$ 99 $S_X$ 72 X
1237
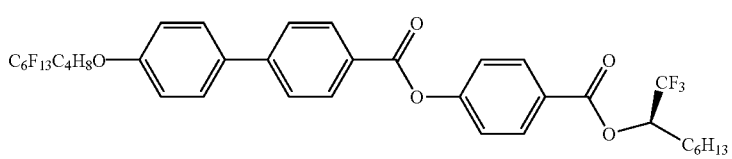
I 137 $S_A$ 107 $S_C$ ? $S_I$ <RT X
1248
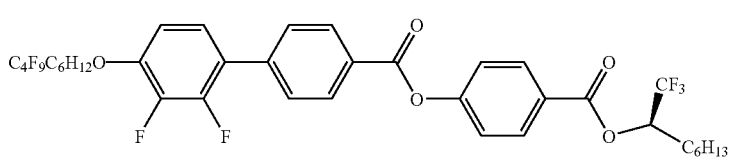
I 86 $S_A$ 74 $S_C$ 68 X
1252
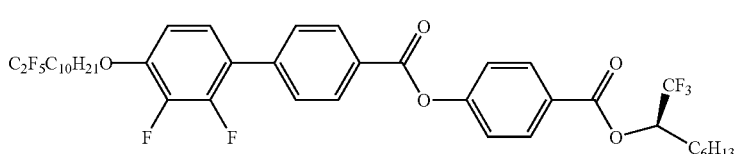
I 167 $S_A$ 59 $S_C$ ? X
1253
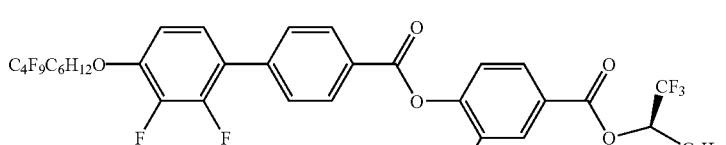
I 62 $S_A$ 46 $S_C$ 23 X
1254
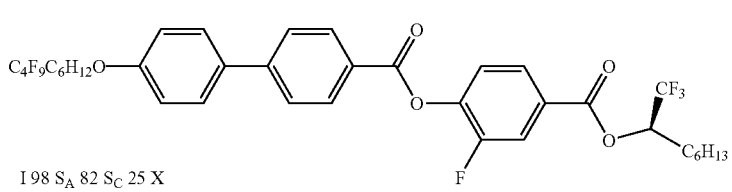
I 98 $S_A$ 82 $S_C$ 25 X -continued Scheme 4: EXEMPLARY COMPOUNDS OF THIS INVENTION

| MDW# | STRUCTURE |
|------|-----------|

1497

$C_4F_9C_6H_{12}O$—[biphenyl with 2,3-diF]—C(O)O—[phenyl]—C(O)O—CH(CH$_3$)—$C_5H_{10}$—PMDS $$PDMS = -\underset{\underset{CH_3}{|}}{\overset{\overset{CH_3}{|}}{Si}}-O-\underset{\underset{CH_3}{|}}{\overset{\overset{CH_3}{|}}{Si}}-CH_3$$

I 96.3 $S_A$ 179.3 $S_C$ 50.3 X (monotropic phase at 15° C., tilt ∡ 38° (35° C.); Ps 182 nC/cm$^2$)

1498

$C_4F_9C_6H_{12}O$—[biphenyl with 2,3-diF]—C(O)O—[phenyl]—C(O)O—CH($C_3H_7$)—$C_6H_{13}$

I 65.3 $S_A$ 41.2 $S_C$ 50.3 X

1249

$C_5H_{11}OC_4H_8O$—[biphenyl]—C(O)O—[phenyl]—C(O)O—CH(CF$_3$)—$C_6H_{13}$

I 92 $S_A$ 80 $S_C$ 25 X

1250

$C_5H_{11}OC_4H_8O$—[biphenyl with 2,3-diF]—C(O)O—[phenyl]—C(O)O—CH(CF$_3$)—$C_6H_{13}$

I 60 $S_A$ 30 $S_C$ 30 X

1251

$C_5H_{11}OC_4H_8O$—[biphenyl with 2,3-diF]—C(O)O—[phenyl]—C(O)O—CH(CH$_3$)—$C_6H_{13}$

I 67 $S_A$ 59 $S_C$ ? X

1396

$C_4F_9C_4H_8O$—[biphenyl with 2,3-diF]—C(O)O—[phenyl]—C(O)O—CH(CF$_3$)—$C_6H_{13}$ Enantiomer of 1228

1397

$C_4F_9C_6H_{12}O$—[biphenyl with 2,3-diF]—C(O)O—[phenyl]—C(O)O—CH(CF$_3$)—$C_6H_{13}$ Enantiomer of 1248

-continued

Scheme 4: EXEMPLARY COMPOUNDS OF THIS INVENTION

| MDW# | STRUCTURE |
|---|---|
| 1498E | $C_4F_9C_6H_{12}O$-[phenyl(2,3-diF)]-[phenyl]-C(=O)O-[phenyl]-C(=O)O-CH($C_3H_7$)($C_6H_{13}$)  Enantiomer of 1498 |

Scheme 5
COMPOSITION OF MX8058[1]

| MDW# | STRUCTURE | Weight % |
|---|---|---|
| 336 | $C_{10}H_{21}$-[pyrimidine]-[phenyl]-O-C(=O)-[cyclohexene]-CH$_2$CH=C(CH$_3$)$_2$ | 12 |
| 576 | $C_{10}H_{21}$-[pyrimidine]-[phenyl]-O-C(=O)-[cyclohexene]-CH$_3$ | 12 |
| 577 | $C_{10}H_{21}$O-[phenyl]-[pyrimidine]-O-C(=O)-[cyclohexene]-CH$_2$CH=C(CH$_3$)$_2$ | 12 |
| 3 | $C_7H_{15}$-[pyrimidine]-[phenyl]-OC$_8$H$_{17}$ | 12.8 |
| 4 | $C_9H_{19}$-[pyrimidine]-[phenyl]-OC$_8$H$_{17}$ | 12.8 |
| 5 | $C_8H_{17}$-[pyrimidine]-[phenyl]-OC$_{12}$H$_{25}$ | 12.8 |
| 6 | $C_7H_{15}$-[pyrimidine]-[phenyl]-OC$_{10}$H$_{21}$ | 12.8 |
| 31 | $C_7H_{15}$-[pyrimidine]-[phenyl]-OC$_7$H$_{15}$ | 12.8 |
| 959[2] | $C_8H_{17}$-[pyrimidine]-[phenyl]-OC$_6$H$_{12}$C$_4$F$_9$ | NA[3] |

Scheme 5
COMPOSITION OF MX8058[1]

| MDW# | STRUCTURE | Weight % |
|---|---|---|
| 1245[2] |  | NA[3] |

[1]Phase diagram: I −82▶ N −59▶ $S_C$ −12▶ X (temperatures in ° C., I = isotropic, N = nematic, $S_C$ = smectic C, X = crystalline);
[2]Optional components that optionally can be added to V-shaped switching mixtures.
[3]Not applicable for MX8058, these are optional components.

Scheme 6: Components for Mixtures of Tables 2A and 2B

| MWD No. | STRUCTURE |
|---|---|
| 1290 | $C_8H_{17}$—[phenyl-pyridyl]—O—CH2—CHF—CHF—$C_6H_{13}$ chain |
| 1290E | $C_8H_{17}$—[phenyl-pyridyl]—O—CH2—CHF—CHF—$C_6H_{13}$ chain (enantiomer) |
| 987 | $C_4F_9C_4H_8O$—[pyrimidine]—[phenyl]—O—CH2—C(CH3)(F)—$C_5H_{11}$ |
| 987E | $C_4F_9C_4H_8O$—[pyrimidine]—[phenyl]—O—CH2—C(CH3)(F)—$C_5H_{11}$ (enantiomer) |
| MTLC 0312 | $C_{12}H_{25}O$—[phenyl]—C(O)O—[naphthyl]—C(O)O—CH2CH2CH2—CH(CH3)—$C_2H_5$ |
| 0312E | $C_{12}H_{25}O$—[phenyl]—C(O)O—[naphthyl]—C(O)O—CH2CH2CH2—CH(CH3)—$C_2H_5$ |
| 959 | $C_7H_{15}$—[pyrimidine]—[phenyl]—O—$(CH_2)_6$—$C_4F_9$ |
| 1441 | $C_{10}H_{21}$—[pyrimidine]—[phenyl]—O—$(CH_2)_6$—$C_4F_9$ |

-continued
Scheme 6: Components for Mixtures of Tables 2A and 2B
| MWD No. | STRUCTURE |
|---|---|
| 1568 | 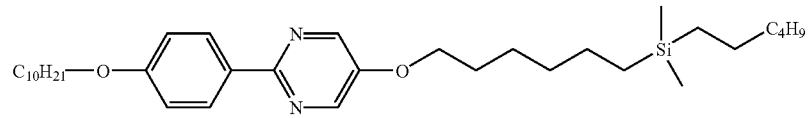 |
| 538 | 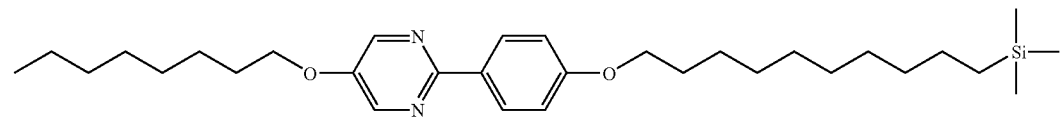 |
| 1567 | 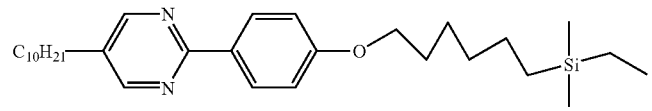 |
| 1795 | 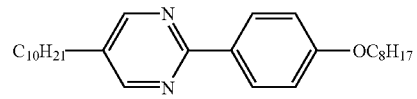 |
| 1744 | 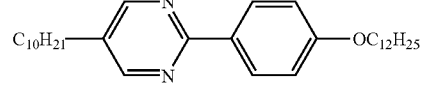 |
| 1591 | 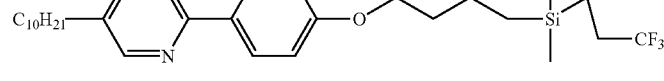 |
| 1595 | 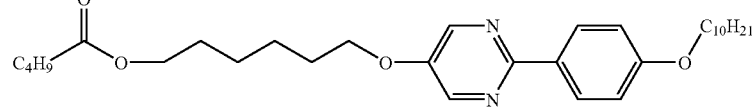 |
| 1586 | 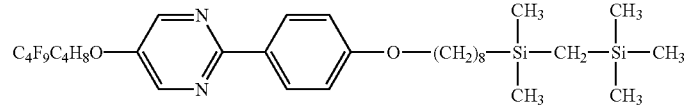 |
| 1596 | 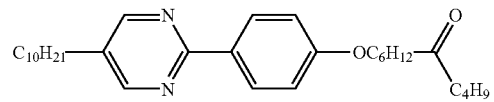 |
| 1608 | 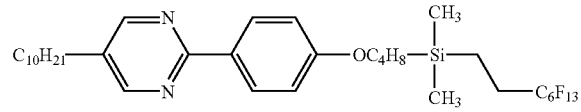 |
| 1632 | 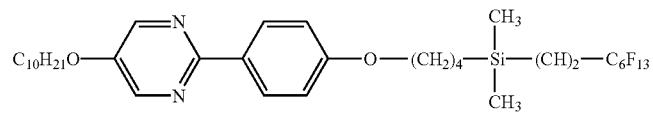 |

Scheme 7:
Generalized Structures of Components of Mixtures of this Invention

Chiral, nonracemic

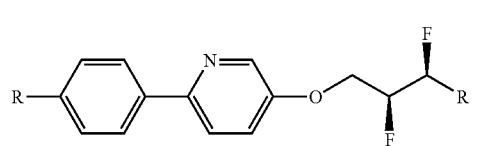

7A and its enatiomers having chiral tail: 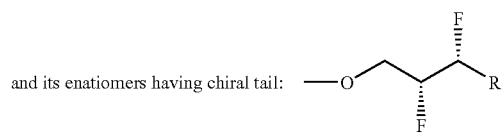

7B

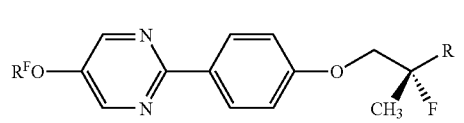

and its enatiomers having the chiral tail: 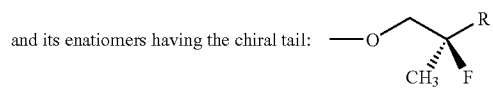

7C

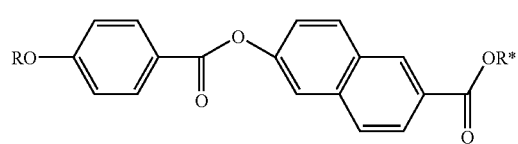

all enantiomers

7D

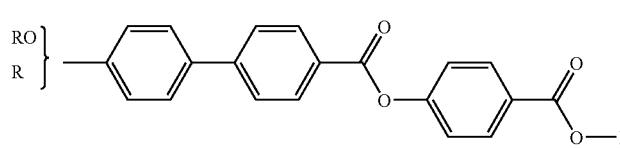

7A-7D

R is an alkyl group (linearor branched) having from 3 to 20 carbon atoms; $R^F$ is a partially fluorinated or perfluorinated tail group including tails having the structure —$(CH_2)n$—$(CF_2)m$—F, where n and m are integers ranging from 1–20, inclusive; and R* is a chiral nonracemic branched alkyl tail group.

Achiral/Racemic Components

7E

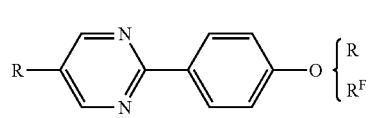

7F

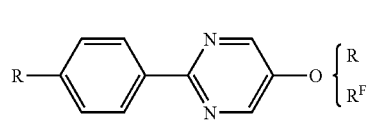

-continued

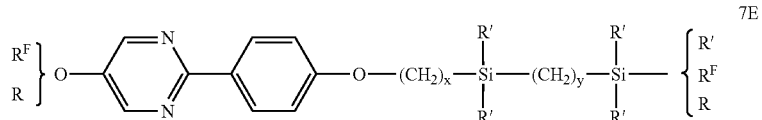 7E

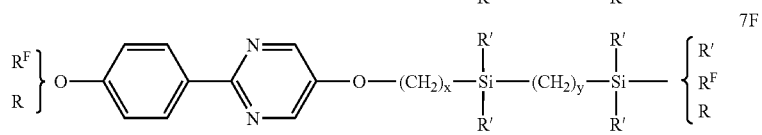 7F x and y are integers ranging form 1–20 inclusive

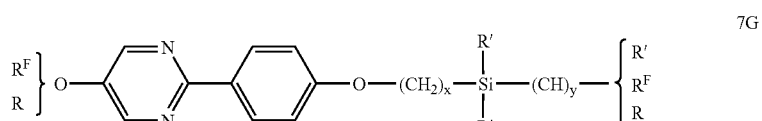 7G x and y are integers ranging form 1–20 inclusive

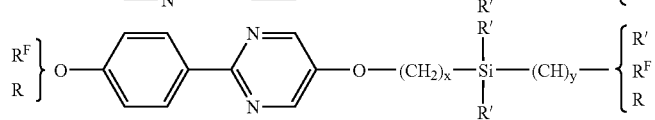 7H h is an integer ranging from 1 to 10, specifically h is 3–8, x is 0 or 1

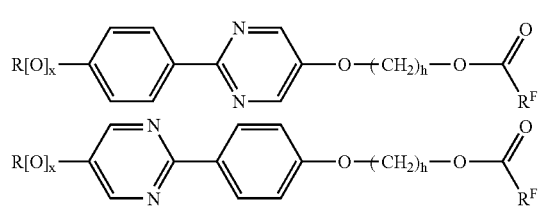 7I

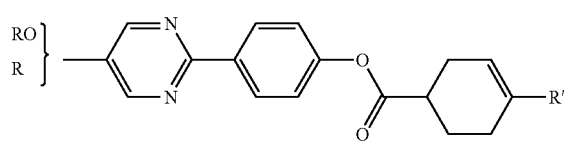 7J

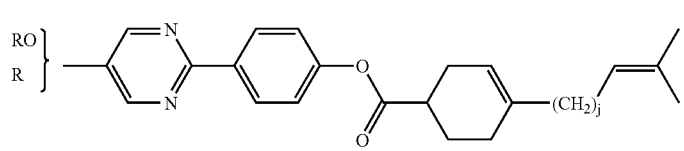

j is an integer ranging from 2–10; specifically j = 2 or 3

7E-J

R is an alkyl group (linear or branched) having from 3 to 20 carbon atoms; $R^F$ is a partially fluorinated or perfluorinated tail group including tails having the structure

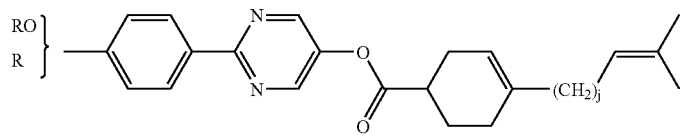

where n and m are integers ranging from 1–20, inclusive; and R' is a lower alkyl group having from 1 to 6 carbon atoms.

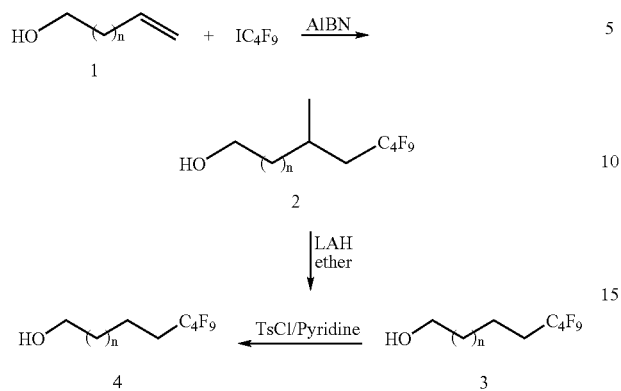
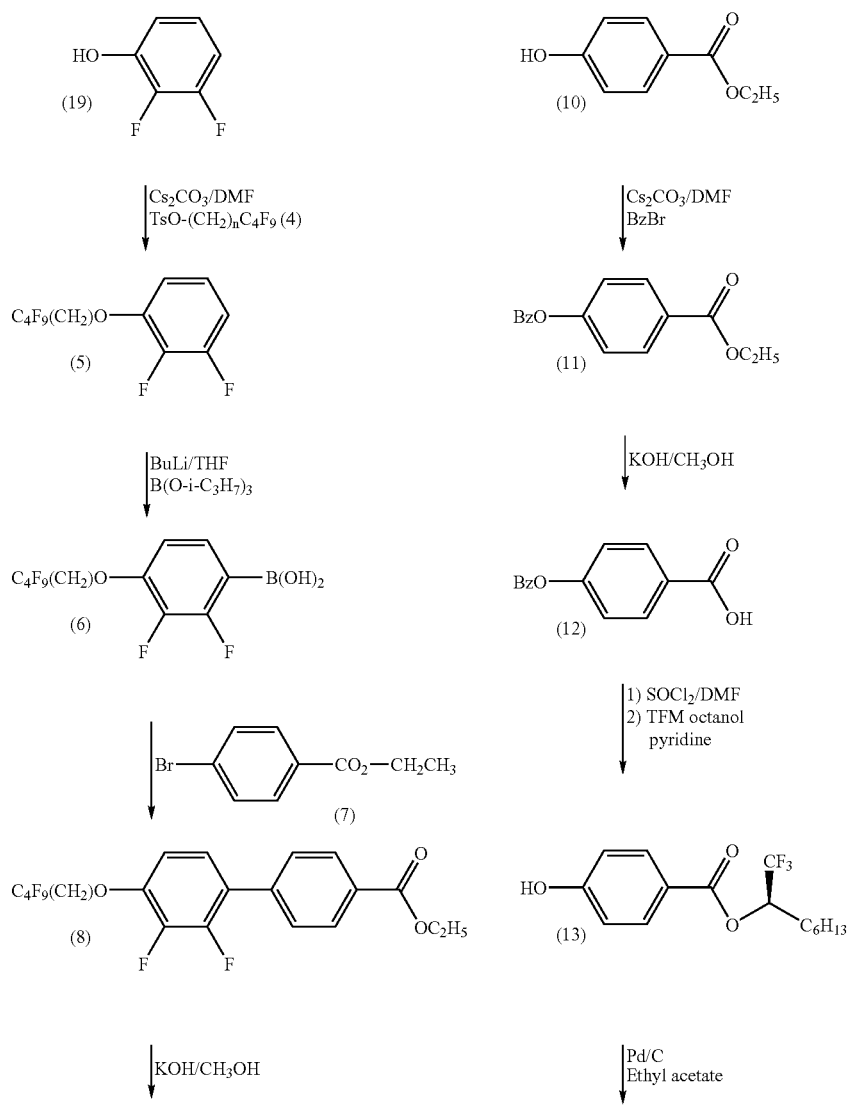

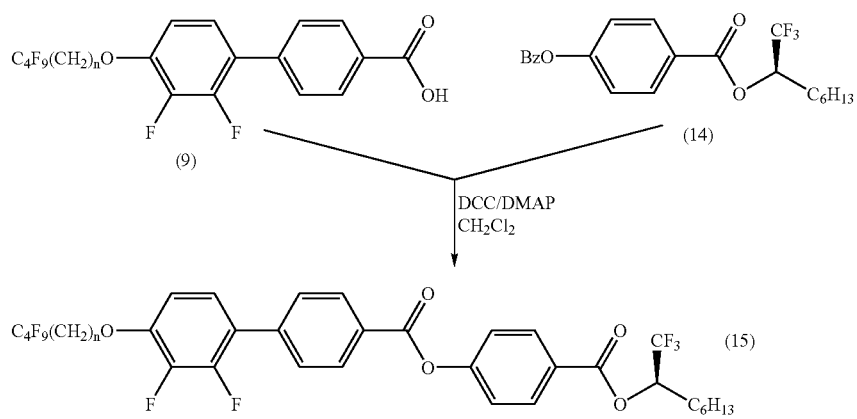
Scheme 10
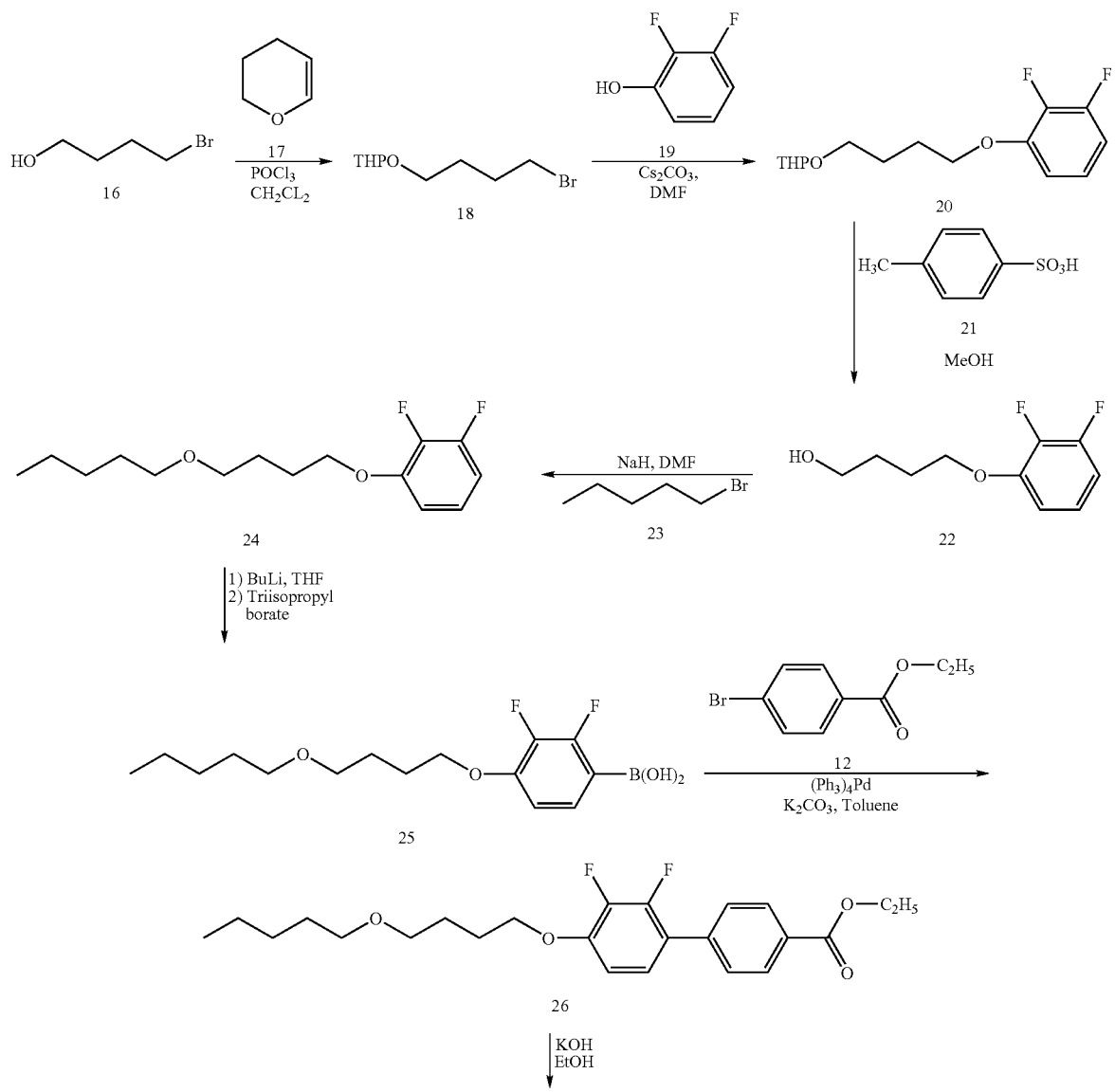

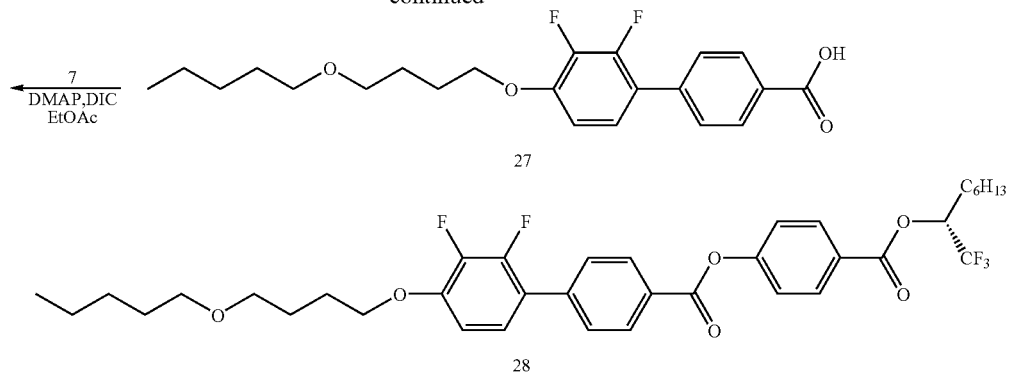
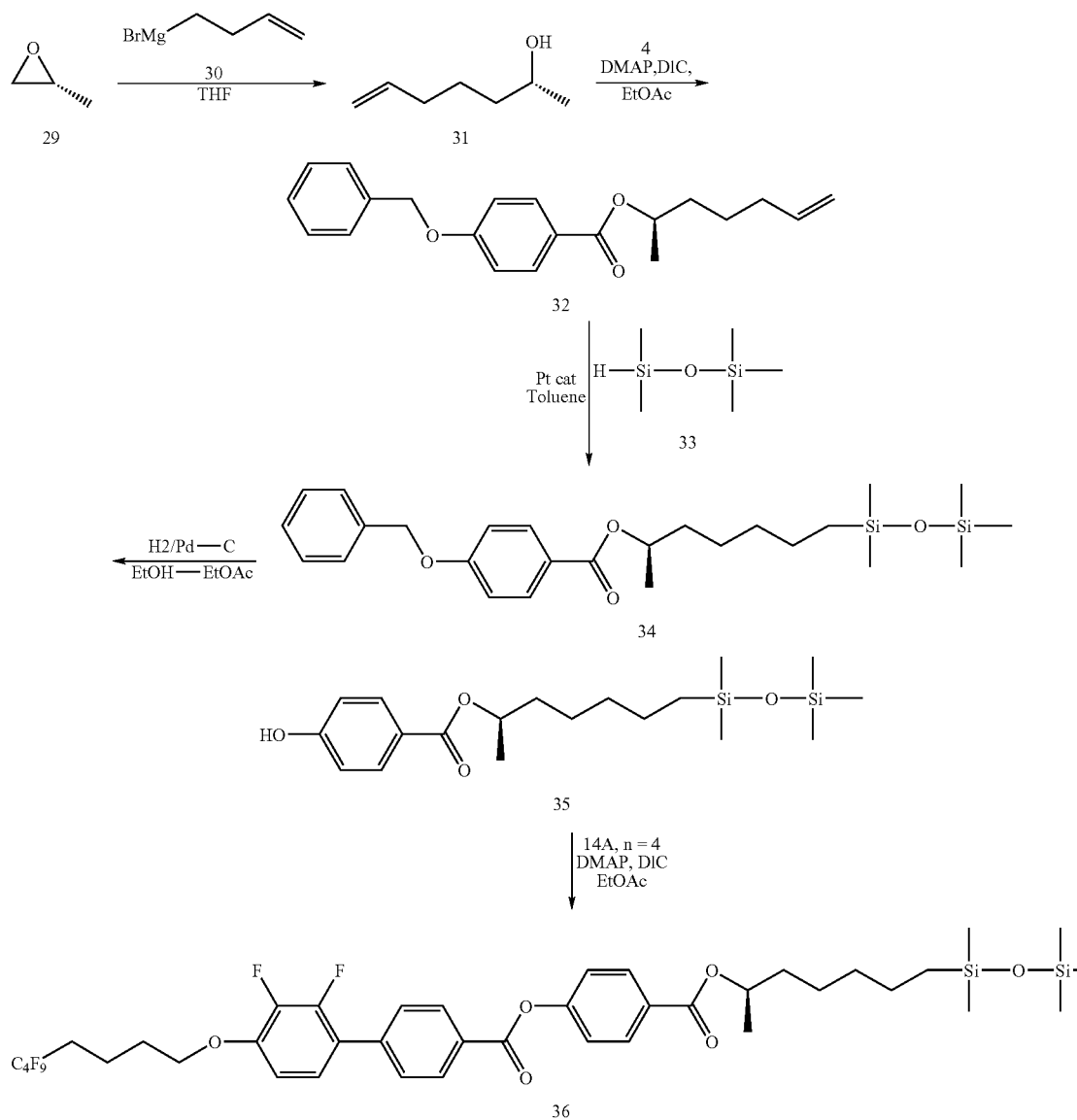
Scheme 11

TABLE 1

Switching Angle MX9102[1] as a Function of Electric Field and Temperature

| Temperature (°C.) | Electric Field (V/μm) | | | | | | |
|---|---|---|---|---|---|---|---|
| | 0.5 | 1 | 1.5 | 2.0 | 2.5 | 3.0 | 3.5 |
| 30 | 5 | 9.5 | 14.6 | 20.3 | 23.3 | 24.6 | 25 |
| 40 | 5 | 10 | 15.4 | 20.2 | 22.6 | 24 | 24.2 |
| 45 | 5 | 12.5 | 18.8 | 20.5 | 22.5 | 23.4 | 23.5 |

[1]MX9102 is a mixture of 66% by weight MDW 1248 and 34% by weight of MX8058 (See Scheme 5). Phase Diagram of MX9102 is I 104 $S_A$ 66 $S_C$ 20 X where temperatures are in °C. Ps of MX9102 is 65 nC/cm².

TABLE 2A

Electro-optical properties of deVries Type Bistable Compositions

| MX | Phase diagram (°C.) | Electric rise time (μs) | Viscosity (mP*S) | Ps (nC/cm²) | Square wave 2.5 V/μm, 100 Hz è | Square wave 2.5 V/μm, 100 Hz ô | Pulse wave 5 V/μm, 100 Hz, 400 μs è | Pulse wave 5 V/μm, 100 Hz, 400 μs ô |
|---|---|---|---|---|---|---|---|---|
| 9136 | I 91-87 A 70.5 C. | 437 | 477 | 32.7 | 27.8 | 220 | 18 | 130 |
| 9136y | I 94-91 A 68.5 C. | 160 | 290 | 49.2 | 22.9 | 180 | 15.5 | 115 |
| 9137 | I 95-92 A 72 C. | 230 | 464 | 54.6 | 26.7 | 131 | 15.2 | 80 |
| 9149 | I 95-93 A 69.5 C. | 265 | 435 | 47 | 26.5 | 140 | 13 | 70 |
| 9157 | I 95-93 A 77 C. | 335 | 318 | 27 | 26 | 210 | 16 | 90 |
| 9159 | I 96-94.5 A 74 C. | 202 | 282 | 38.7 | | | | |
| 9163 | I 93.7-89 A 67 C. | 125 | 213 | 40.3 | 22.4 | 120 | | |
| 9165 | I 94-90 A 70.5 C. | 135 | 214 | 40.5 | 23 | 123 | | |
| 9166 | I 92-88 A 71.5 C. | 135 | 200 | 39 | 23.5 | 133 | 14.3 | 62 |
| 9170 | I 94.5-92 A 71 C. | 150 | 233 | 43 | 23.1 | 120 | 15.5 | 56 |
| 9171 | I 93-90.5 A 73.5 C. | 165 | 282.6 | 40.9 | 23.7 | 123 | 16.4 | 60 |
| 9172 | I 93.6-91.5 A 75.5 C. | 125 | 190 | 33 | 22.9 | 127 | 14.4 | 65 |
| 9173 | I 93.5-91 A 74.5 C. | 127 | 186 | 34.5 | 23.5 | 126 | 15.2 | 58 |
| 9195 | I 95-93.5 A 77 C. | 110 | 214 | 45.5 | 23.8 | 85 | | |
| 9196 | I 93.7-91.5 A 72 C. | 105 | 159 | 36.7 | 22.4 | 144 | 17 | 55 |
| 9197 | I 93.7-91.5 A 66.5 C. | 112 | 134 | 31.4 | 19.5 | 120 | | |
| 9198 | I 93.5-91.5 A 72.5 C. | 162 | 206 | 34.7 | 23.7 | 210 | | |

TABLE 2B

De Vries Type Bistable Mixture Compositions

| Composition MX | MDW 1396 | MDW 1397 | MDW 1498 | MDW 959 | MDW 1441 | MDW 1568 | MDW 538 | MDW 1567 | MDW 1290 | MDW 987 | MTAX 0312 | A-2 028 | A-2 032 | 1591 | 1595 | 1586 | 1596 | 1608 | 1632 |
|---|---|---|---|---|---|---|---|---|---|---|---|---|---|---|---|---|---|---|---|
| 9136 | 10 | 20 | 15 | 10 | 10 | 10 | 21 | 4 | | | | | | | | | | | |
| 9136y | 8.5 | 17 | 12.8 | 8.5 | 8.5 | 8.5 | 17.8 | 3.4 | 15 | | | | | | | | | | |
| 9137 | 15 | 25 | 5 | 15 | 10 | 5 | 15 | 5 | 5 | | | | | | | | | | |
| 9149 | 10 | 20 | 10 | 10 | 15 | | 15 | | 10 | 10 | | | | | | | | | |
| 9157 | 10 | 15 | 10 | 10 | 15 | 10 | 10 | | | | 10 | 10 | | | | | | | |
| 9159 | 9 | 13.5 | 9 | 9 | 13.5 | 9 | 9 | | 10 | | 9 | 9 | | | | | | | |
| 9163 | 10 | 20 | 5 | 10 | 15 | | 15 | | 10 | | | 10 | 5 | | | | | | |
| 9165 | 9.5 | 19 | 4.7 | 9.5 | 14.3 | | 14.3 | | 9.5 | | | 9.5 | 4.7 | 5 | | | | | |
| 9166 | 9 | 18 | 4.5 | 9 | 13.5 | | 13.5 | | 9 | | | 9 | 4.5 | 10 | | | | | |
| 9170 | 10 | 20 | | 10 | 12 | | 15 | | 10 | | | 7 | | | 8 | | 8 | | |
| 9171 | 9 | 18 | | 9 | 10.8 | | 13.5 | | 9 | | | 6.3 | | 10 | 7.2 | | 7.2 | | |
| 9172 | 7 | 8 | | 10 | 10 | | 15 | | 12 | | | | | 15 | 5 | 10 | 8 | | |
| 9173 | 6.7 | 12.6 | | 9.5 | 9.5 | | 14.2 | | 11.5 | | | | | 14.2 | 4.8 | 9.5 | 7.6 | | |
| 9195 | 10 | 15 | 10 | 10 | 12 | | 13 | | 12 | | | 7 | | 15 | | 6 | | | |
| 9196 | 10 | 15 | 10 | 10 | | | 15 | | 10 | | | 9.1 | | 10.7 | | 5.8 | 4.4 | | |
| 9197 | 10 | 15 | 10 | 8 | | | 10 | | 10 | | | 7 | | 10 | | 5 | 5 | | 10 |
| 9198 | 8 | 16 | 8 | 9.6 | | | 12 | | 8 | | | 5.6 | | 10 | 6.4 | | 6.4 | | 10 |

We claim:

1. A liquid crystal composition comprising a compound of the formula:

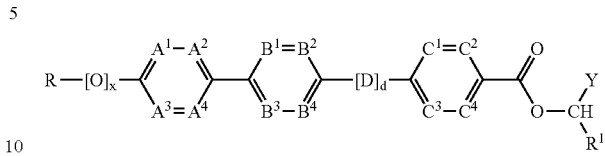

wherein:

x is 0 or 1;

R is $C_nF_{2n+1}C_mH_{2m}$, where
- m is an integer greater than 3 and less than or equal 10; and
- n is an integer from 1 to 10 and m+n is less than or equal to 20;
- d is 0 or 1;
- each of $A^1, A^2, A^3, A^4, B^1, B^2, B^3, B^4, C^1, C^2, C^3$, and $C^4$ is independently CH, N, or CF, provided no more than 2 of $A^1, A^2, A^3$, and $A^4$ is N, no more than 2 of $B^1, B^2, B^3$, and $B^4$ is N, and no more than 2 of $C^1, C^2, C^3$, and $C^4$ is N;
- D is —C(=O)O—, —OC(=O)—, —CH$_2$—CH$_2$—, —CH=CH— or —C≡C—;
- Y is an alkyl or fluorinated alkyl group having from one to six carbon atoms; and
- $R^1$ is a straight chain $C_{2-12}$ alkyl, $C_{2-12}$ alkenyl or $C_{2-12}$ alkynyl containing at least one Si atom, where one or more non-neighboring CH$_2$ groups can be replaced with —O—, —S—, —Si(R')$_2$—, —Si(R')$_2$—(CH$_2$)$_p$—Si(R')$_2$—, where p is an integer ranging from 1 to 6, —Si(R')$_2$—O—, or —Si(R')$_2$—O—Si(R')$_2$—O—, wherein each R' is independently alkyl or fluorinated alkyl.

2. The liquid crystal composition of claim 1, which exhibits a de Vries smectic A phase.

3. The liquid crystal composition of claim 1, which exhibits V-shaped switching when incorporated as an aligned layer in an analog liquid crystal device.

4. The liquid crystal composition of claim 1, wherein d is 1 and D is —COO— or —OOC—.

5. The liquid crystal composition of claim 4 wherein Y is an alkyl or perfluorinated alkyl group having 1 to 3 carbon atoms.

6. The liquid crystal composition of claim 1 wherein d is 1 and D is —CH$_2$—CH$_2$—.

7. The liquid crystal composition of claim 1, wherein said composition further comprises a second compound of the formula:

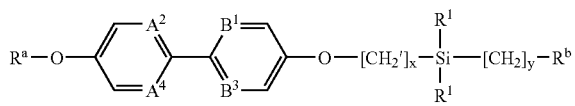

wherein
- x is an integer from 1 to 10
- y is an integer from 0 to 10;
- R' is $C_{1-6}$ alkyl;
- $R^a$ is $C_{3-20}$ alkyl or $C_{1-20}$ partially fluorinated or perfluorinated alkyl;
- $R^b$ is $C_{1-20}$ alkyl or $C_{1-20}$ partially fluorinated or perfluorinated alkyl;
- $A^2$ and $A^4$ are CH or N; and
- $B^1$ and $B^3$ are CH or N.

8. The mixture of claim 7 wherein the one or more components of the listed formulas are present in a total amount of about 25% by weight or more of the mixture.

9. The liquid crystal composition of claim 7 further comprising a compound of the formula:

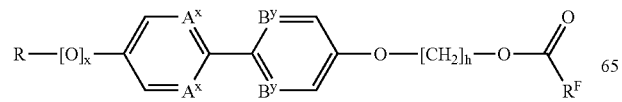

wherein
- x is 0 or 1;
- h is an integer from 1 to 10;
- R is $C_{3-20}$ alkyl;
- $R^F$ is $C_{1-20}$ perfluorinated or partially fluorinated alkyl;
- $A^x$ are CH or N;
- when $A^x$ are CH, then $B^y$ are N; and
- when $A^x$ are N, then $B^y$ are CH.

10. The liquid crystal composition of claim 7 further comprising a compound of the formula:

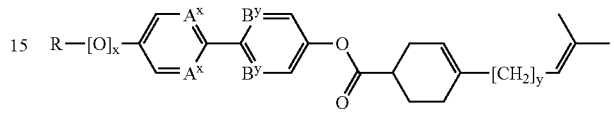

wherein
- j is an integer from 2 to 10;
- R is $C_{3-20}$ alkyl;
- x is 0 or 1;
- $A^x$ are CH or N;
- when $A^x$ are CH, then $B^y$ are N; and
- when $A^x$ are N, then $B^y$ are CH.

11. The liquid crystal composition of claim 10 further comprising a compound of the formula:

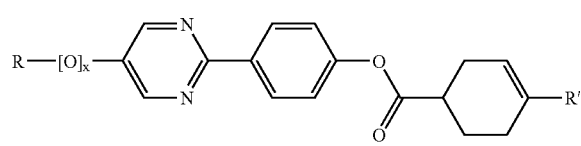

wherein
- x is 0 or 1;
- R is $C_{3-20}$ alkyl; and
- R' is a lower alkyl group having from 1 to 6 carbon atoms.

12. The liquid crystal composition of claim 7 which has a total number of components of 5 or more.

13. The liquid crystal composition of claim 11 further comprising a second chiral nonracemic component which selected from the group consisting of the formulas:

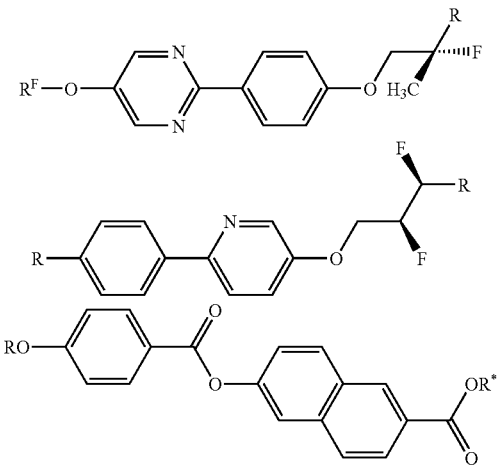

-continued

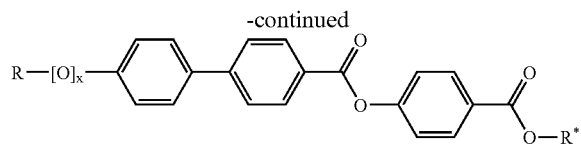

or an enantiomer or a mixture thereof, wherein x is 0 or 1,
R is an $C_{2-20}$ alkyl;
$R^*$ is a chiral $C_{3-20}$ alkyl group; and
$R^F$ is $C_{3-20}$ perfluoro or partially fluorinated alkyl.

14. The liquid crystal composition of claim 13 wherein the second chiral nonracemic component is present in the mixture at a level of at least about 10% by weight.

15. The liquid crystal composition of claim 13 further comprising an achiral or racemic component selected from the group consisting of a compound of the formulas:

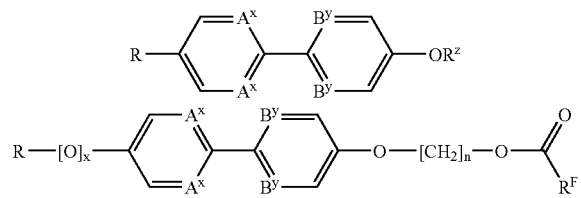

and a mixture thereof, wherein
h is an integer from 1–10;
x is 0 or 1;
R is $C_{3-20}$ alkyl;
$R^F$ is partially fluorinated or perfluorinated $C_{1-20}$ alkyl;
$A^x$ are CH or N;
when $A^x$ are CH, then $B^y$ are N; and
when $A^x$ are N, then $B^y$ are CH.

16. The liquid crystal composition of claim 15 which contains a total number of components of 5 or more.

17. The liquid crystal composition of claim 15 which contains at least one component of each formula listed.

18. The liquid crystal composition of claim 2 wherein Y is an alkyl or fluorinated alkyl group having from 1 to 3 carbon atoms.

19. The liquid crystal composition of claim 18 wherein Y is $CF_3$.

20. The liquid crystal composition of claim 19 wherein $R^1$ is an alkyl group.

21. The liquid crystal composition of claim 20 wherein $R^1$ is an alkyl group having from 4 to 8 carbon atoms.

22. The liquid crystal composition of claim 19 wherein each of $A^1$, $A^2$, $A^3$, $A^4$, $B^1$, $B^2$, $B^3$, $B^4$, $C^1$, $C^2$, $C^3$, and $C^4$ is independently CH or CF.

23. The liquid crystal composition of claim 22 wherein d is 1 and D is —COO— or —OOC—.

24. The liquid crystal composition of claim 19 wherein at least each of $A^1$, $A^2$, $A^3$, $A^4$, $B^1$, $B^2$, $B^3$, $B^4$, $C^1$, $C^2$, $C^3$, and $C^4$ is N.

25. The liquid crystal composition of claim 24 wherein d is 1 and D is —COO— or —OOC—.

26. The liquid crystal composition of claim 19, wherein $R^1$ comprises a moiety of the formula:

—Si(R')$_2$—(CH$_2$)$_p$—Si(R')$_2$— where p is 1–6 and R' is $C_{1-3}$ alkyl.

27. The liquid crystal composition of claim 19, wherein $R^1$ comprises a moiety of the formula:

—Si(R')$_2$—CH$_2$—Si(R')$_2$— where R' is $C_{1-3}$ alkyl.

28. The liquid crystal composition of claim 19, wherein $R^1$ comprises a moiety of the formula:

—Si(R')$_2$—O— where R' is $C_{1-3}$ alkyl.

29. The liquid crystal composition of claim 19, wherein $R^1$ comprises a moiety of the formula:

—Si(R')$_2$—O—Si(R')$_2$— where R' is $C_{1-3}$ alkyl.

30. The liquid crystal composition of claim 1, wherein $R^1$

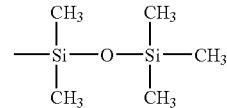

comprises a moiety of the formula —Si(CH$_3$)$_2$—O—Si(CH$_3$)$_3$.

31. The liquid crystal composition of claim 30 wherein each of $A^1$, $A^2$, $A^3$, $A^4$, $B^1$, $B^2$, $B^3$, $B^4$, $C^1$, $C^2$, $C^3$, and $C^4$ is independently CH or CF.

32. The liquid crystal composition of claim 1, wherein Y is $CF_3$.

33. The liquid crystal composition of claim 32 wherein each of $A^1$, $A^2$, $A^3$, $A^4$, $B^1$, $B^2$, $B^3$, $B^4$, $C^1$, $C^2$, $C^3$, and $C^4$ is independently CH or CF.

34. The liquid crystal composition of claim 2 which exhibits a Ps of 27 nC/cm$^2$ or greater.

35. The liquid crystal composition of claim 2 which exhibits a Ps of 40 nC/cm$^2$ or greater.

36. The liquid crystal composition of claim 2 which when introduced as an aligned layer in a liquid crystal device exhibits an electric rise time of 150 µsec or less.

37. The liquid crystal composition of claim 2 which exhibits viscosity of 200 mP*S or less.

38. The liquid crystal composition of claim 2 which exhibits a smectic A phase which extends over a range of 20° C. or more.

39. The liquid crystal composition of claim 2 which exhibits both a smectic A and a smectic C phase.

40. The liquid crystal composition of claim 39 which exhibits a smectic C phase with a temperature range encompassing room temperature.

41. A compound having the formula:

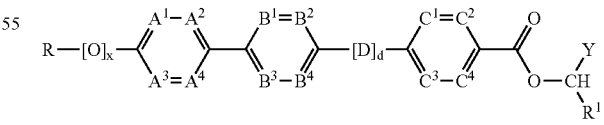

wherein:
x is 0 or 1;
R is $C_nF_{2n+1}C_mH_{2m}$
where
m is an integer greater than 3 and less than or equal to 10; and
n is an integer from 1 to 10;

each of $A^1$, $A^2$, $A^3$, $A^4$, $B^1$, $B^2$, $B^3$, $B^4$, $C^1$, $C^2$, $C^3$, and $C^4$ is independently CH, N, or CF, provided no more than 2 of $A^1$, $A^2$, $A^3$, and $A^4$ is N, more than 2 of $B^1$, $B^2$, $B^3$, and $B^4$ is N, and no more than 2 of $C^1$, $C^2$, $C^3$, and $C^4$ is N;

d is 0 or 1;

D is —C(=O)O—, —OC(=O)—, —CH$_2$—CH$_2$—, —CH=CH— or —C≡C—;

Y is an alkyl or fluorinated alkyl group having from one to six carbon atoms; and $R^1$ is $C_{2-12}$ alkyl, $C_{2-12}$ alkenyl, or $C_{2-12}$ alkynyl containing at least one Si atom, where one or more non-neighboring CH$_2$ groups can be replaced with an —O—, —S—, —Si(R')$_2$—, —Si(R')$_2$—(CH$_2$)$_p$—Si(R')$_2$—, where p is an integer ranging from 1 to 6, or —Si(R')$_2$—O—, —Si(R')$_2$—O—Si(R')$_2$—O—, wherein each R' is independently alkyl or fluorinated alkyl having from one to six carbon atoms.

42. The compound of claim 41 wherein Y is CF$_3$.

43. The compound of claim 41 wherein R is $C_4F_9C_4H_8$—.

44. The compound of claim 41 wherein R is $C_4F_9C_6H_{12}$—.

45. An electrooptical device comprising an aligned liquid crystal layer which comprises the liquid crystal composition of claim 1.

46. The electrooptical device of claim 45 wherein the device exhibits bistable switching.

47. The device of claim 46 which is an analog device exhibiting V-shaped switching.

48. An electrooptical device comprising an aligned layer which comprises the liquid crystal composition of claim 1 and which can be operated at low driving voltages at high frequency and using a symmetrical driving scheme for DC balance.

49. A method for making a bistable liquid crystal electrooptical device which comprises the step of aligning a liquid crystal composition of claim 1 which exhibits a de Vries smectic A phase in a bookshelf alignment in the device.

50. A method for making an electrooptical device that exhibits analog switching which comprises she step of aligning a liquid crystal composition of claim 1 which exhibits V-shaped switching in the device.

51. A method for making a liquid crystal composition which exhibits both bistable switching and V-shaped switching which comprises the step of combining one or more chiral nonracemic compounds of claim 1 with one or more liquid crystal compounds which have one or both tail groups that are partially fluorinated or that contain one or more Si atoms.

52. The method of claim 51 wherein about 25% to about 65% of a chiral nonracemic compound of claim 1 is combined to form the liquid crystal composition.

* * * * *

UNITED STATES PATENT AND TRADEMARK OFFICE
CERTIFICATE OF CORRECTION

PATENT NO. : 7,083,832 B2 Page 1 of 1
APPLICATION NO. : 09/854181
DATED : August 1, 2006
INVENTOR(S) : Xin Hua Chen et al.

It is certified that error appears in the above-identified patent and that said Letters Patent is hereby corrected as shown below:

Column 59, lines 40-45, that part of the formula reading "$[CH_2']_x$" should read --$[CH_2]_x$--.
Column 60, lines 13-18, that part of the formula reading "$[CH_2]_y$" should read --$[CH_2]_j$--.
Column 61, lines 20-25, that part of the formula reading "$OR^Z$" should read --$OR^F$--.
Column 61, lines 25-30, that part of the formula reading "$[CH_2]_n$" should read --$[CH_2]_h$--.
Column 62, lines 17-23, the formula

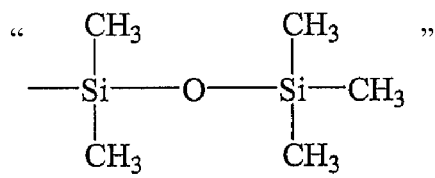

should be deleted in its entirety.
Column 63, line 16, delete the space 8 characters in length that follows the first comma.
Column 64, line 12, delete "she" and insert --the--.

Signed and Sealed this

Sixth Day of March, 2007

JON W. DUDAS
*Director of the United States Patent and Trademark Office*